(12) United States Patent
Nakadai

(10) Patent No.: US 10,698,874 B2
(45) Date of Patent: Jun. 30, 2020

(54) SYSTEM, METHOD, AND PROGRAM FOR BUSINESS INTELLIGENCE USING TABLE OPERATIONS IN A RELATIONAL DATABASE

(71) Applicant: NEC CORPORATION, Tokyo (JP)

(72) Inventor: Shinji Nakadai, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 250 days.

(21) Appl. No.: 15/562,542

(22) PCT Filed: Feb. 25, 2016

(86) PCT No.: PCT/JP2016/001011
§ 371 (c)(1),
(2) Date: Sep. 28, 2017

(87) PCT Pub. No.: WO2016/157707
PCT Pub. Date: Oct. 6, 2016

(65) Prior Publication Data
US 2018/0107699 A1   Apr. 19, 2018

(30) Foreign Application Priority Data
Mar. 30, 2015  (JP) .................. 2015-069370

(51) Int. Cl.
*G06F 16/22* (2019.01)
*G06F 16/23* (2019.01)
(Continued)

(52) U.S. Cl.
CPC .......... *G06F 16/2282* (2019.01); *G06F 16/00* (2019.01); *G06F 16/211* (2019.01); *G06F 16/23* (2019.01); *G06F 16/284* (2019.01)

(58) Field of Classification Search
CPC ...... G06F 16/285; G06F 16/284; G06F 16/28; G06F 16/2282; G06F 16/00; G06F 16/23; G06F 16/211
See application file for complete search history.

(56) References Cited

U.S. PATENT DOCUMENTS

2003/0018620 A1    1/2003  Vishnubhotla
2004/0225673 A1*  11/2004  Beck ............... G06F 16/285
(Continued)

FOREIGN PATENT DOCUMENTS

| JP | 2001-216307 A | 8/2001 |
| JP | 2004-287914 A | 10/2004 |
| JP | 2015-026188 A | 2/2015 |

OTHER PUBLICATIONS

International Search Report for PCT/JP2016/001011 dated May 24, 2016.

*Primary Examiner* — Jesse P Frumkin
(74) *Attorney, Agent, or Firm* — Sughrue Mion, PLLC

(57) ABSTRACT

A data acquiring section specifies individual tables to serve as reference destinations of designated respective foreign key columns and, for each combination of key values in primary key columns of the specified individual tables, acquires a total value of relation values in a designated relation value column. A grouping section groups the respective key values in the primary key columns of the individual tables on the basis of the total value acquired for each combination of the key values in the primary key columns of the individual tables and a statistical model of a designated type. An attribute value column adding section adds, to each individual table, an attribute value column of which attribute value is identification information on a group to which each key value in each primary key column of each individual table belongs.

6 Claims, 12 Drawing Sheets

(51) Int. Cl.
  *G06F 16/21*         (2019.01)
  *G06F 16/28*         (2019.01)
  *G06F 16/00*         (2019.01)

(56) References Cited

U.S. PATENT DOCUMENTS

| | | | |
|---|---|---|---|
| 2008/0270339 A1* | 10/2008 | Copeland | G06F 16/24564 706/50 |
| 2012/0109875 A1* | 5/2012 | Sundaram | G06F 16/285 707/600 |
| 2012/0254173 A1* | 10/2012 | Graefe | G06F 16/24552 707/737 |
| 2013/0144833 A1* | 6/2013 | Ivanova | G06F 16/283 707/600 |
| 2013/0339379 A1* | 12/2013 | Ferrari | G06F 16/284 707/766 |
| 2014/0101154 A1* | 4/2014 | Nagulakonda | G06Q 10/06 707/737 |
| 2015/0205855 A1* | 7/2015 | Takahashi | G06Q 10/08 707/737 |
| 2018/0225581 A1* | 8/2018 | Oyamada | G06F 16/00 |
| 2018/0247364 A1* | 8/2018 | Nakadai | G06Q 30/02 |

\* cited by examiner

FIG. 6

CUSTOMER MASTER

| CUSTOMER ID | AGE | SEX | ID OF CUSTOMER ID GROUP |
|---|---|---|---|
| ... | ... | ... | ... |
| 101 | 28 | MALE | 17 |
| 150 | 23 | MALE | 13 |
| 183 | 48 | FEMALE | 19 |
| 192 | 25 | FEMALE | 17 |
| ... | ... | ... | ... |

PRODUCT MASTER

| PRODUCT ID | PRODUCT CATEGORY | ID OF PRODUCT ID GROUP |
|---|---|---|
| ... | ... | ... |
| 53 | JACKET | 22 |
| 50 | PET FOOD | 44 |
| ... | ... | ... |

FIG. 11

KEY COLUMN OF EMPLOYEE ID

| COMPANY ID | IN-COMPANY EMPLOYEE ID |
|---|---|
| : | : |
| 1001 | 12345 |
| 1002 | 12345 |
| : | : |

FIG. 12

KEY COLUMN OF NUMBER OF PURCHASES

|   | DAYTIME NUMBER OF PURCHASES | NIGHTTIME NUMBER OF PURCHASES |
|---|---|---|
|   | : | : |
| P | 12 | 5 |
| Q | 7 | 10 |
|   | : | : |

FIG. 13

| CUSTOMER ID | COMPANY ID |
|---|---|
| : | : |
| 175 | 1326 |
| : | : |

SYSTEM, METHOD, AND PROGRAM FOR BUSINESS INTELLIGENCE USING TABLE OPERATIONS IN A RELATIONAL DATABASE

CROSS REFERENCE TO RELATED APPLICATIONS

This application is a National Stage of International Application No. PCT/JP2016/001011 filed Feb. 25, 2016, claiming priority based on Japanese Patent Application No. 2015-069370 filed Mar. 30, 2015, the contents of all of which are incorporated herein by reference in their entirety.

TECHNICAL FIELD

The present invention relates to a table operation system, a table operation method, and a table operation program configured to operate a table of a predetermined database.

BACKGROUND ART

In the field of business intelligence (BI), it is conceivable to support analyst decision-making by presenting information satisfying a condition designated by the analyst. An example thereof is indicated below.

FIG. 16 is a schematic diagram illustrating various tables included in a database. FIG. 16 illustrates a purchase table, a customer master, a product master, and a store master. In the purchase table, a customer ID, a product ID, a store ID, and a purchase quantity are associated with each other so as to indicate which customer purchased how many of which product at which store. The customer master indicates an attribute value of a particular customer (age in the example illustrated in FIG. 16) for each customer ID. The product master indicates an attribute value of a particular product (a product category in the example illustrated in FIG. 16) for each product ID. The store master indicates the attribute of a particular store (in the example illustrated in FIG. 16, a district where the store is located) for each store ID.

An example is indicated below in which a BI tool (illustration is omitted) extracts information satisfying a condition designated by an analyst from the database exemplified in FIG. 16. It is supposed that the analyst wishes to know a "purchase quantity of jackets purchased by people in twenties at Kawasaki". In this case, the analyst designates a condition of "twenties" with respect to the customer, designates a condition of "jacket" with respect to the product, and designates a condition of "Kawasaki" with respect to the store. Then, the BI tool narrows down the customer ID of a customer corresponding to "twenties" from the customer master, narrows down the product ID of a product corresponding to "jacket" from the product master, and narrows down the store ID of a store corresponding to "Kawasaki" from the store master. Subsequently, the BI tool specifies a row including a combination of the above-mentioned customer ID, product ID, and store ID from the purchase table. In this example, rows A and C in the purchase table are specified. Then, the BI tool calculates the sum of the purchase quantity in each of these rows to present to the analyst.

In FIG. 16, although information on purchase time is not included in the purchase table, it is also conceivable that the analyst requests to display a change in purchase quantity per period (for example, every month) in the purchase table, including the purchase time. In this case, it is also conceivable that the BI tool calculates the "purchase quantity of jackets purchased by people in twenties at Kawasaki" for each month as described above and displays a graph exemplified in FIG. 17. FIG. 17 exemplifies a monthly change in "purchase quantity of jackets purchased by people in twenties at Kawasaki". The analyst can check information visualized as exemplified in FIG. 17 to make the decision.

Meanwhile, Patent Literature 1 describes an analysis environment in which a relational database server and an online analytical processing (OLAP) server are connected through a network.

CITATION LIST

Patent Literature

PTL 1: Japanese Patent Application Laid-Open No. 2004-287914

SUMMARY OF INVENTION

Technical Problem

In a method of presenting information by a BI tool as described above, an analyst can designate only the information indicated as an attribute in each master (for example, the customer master, the product master, and the store master exemplified in FIG. 16) as a condition. Additionally, designation of such a condition is not necessarily appropriate. For example, the above example has indicated a case where the analyst designates the condition of "twenties" with respect to the customer, designates the condition of "jacket" with respect to the product, and designates the condition of "Kawasaki" with respect to the store. According to designation of such conditions, there may be cases where information to be helpful for decision-making is not presented.

It is therefore an object of the present invention to provide a table operation system, a table operation method, and a table operation program capable of solving a technical problem for altering the configuration of a table such that a condition for obtaining easily analyzable information can be designated.

Solution to Problem

A table operation system according to the present invention is characterized by including a designation accepting means configured to accept designation of at least two foreign key columns, designation of a relation value column, and designation of a type of a statistical model associated with the relation value column in a table having two or more foreign key columns and one or more relation value columns; a data acquiring means configured to specify individual tables to serve as reference destinations of the designated respective foreign key columns and acquire a total value of relation values in the relation value column for each combination of key values in primary key columns of the specified individual tables; a grouping means configured to group the respective key values in the primary key columns of the individual tables on the basis of the total value acquired for each combination of the key values in the primary key columns of the individual tables and the statistical model of the designated type; and an attribute value column adding means configured to add, to each individual table, an attribute value column of which attribute value is identification information on a group to which each key value in each primary key column of each individual table belongs.

In addition, a table operation method according to the present invention is characterized by accepting designation of at least two foreign key columns, designation of a relation value column, and designation of a type of a statistical model associated with the relation value column in a table having two or more foreign key columns and one or more relation value columns; specifying individual tables to serve as reference destinations of the designated respective foreign key columns and acquiring a total value of relation values in the relation value column for each combination of key values in primary key columns of the specified individual tables; grouping the respective key values in the primary key columns of the individual tables on the basis of the total value acquired for each combination of the key values in the primary key columns of the individual tables and the statistical model of the designated type; and adding, to each individual table, an attribute value column of which attribute value is identification information on a group to which each key value in each primary key column of each individual table belongs.

Furthermore, a table operation program according to the present invention is characterized by causing a computer to execute designation accepting processing of accepting designation of at least two foreign key columns, designation of a relation value column, and designation of a type of a statistical model associated with the relation value column in a table having two or more foreign key columns and one or more relation value columns; data acquiring processing of specifying individual tables to serve as reference destinations of the designated respective foreign key columns and acquiring a total value of relation values in the relation value column for each combination of key values in primary key columns of the specified individual tables; grouping processing of grouping the respective key values in the primary key columns of the individual tables on the basis of the total value acquired for each combination of the key values in the primary key columns of the individual tables and the statistical model of the designated type; and attribute value column adding processing of adding, to each individual table, an attribute value column of which attribute value is identification information on a group to which each key value in each primary key column of each individual table belongs.

Advantageous Effects of Invention

By the technical means of the present invention, it is possible to obtain a technical effect that the configuration of a table can be altered such that a condition for obtaining easily analyzable information can be designated.

BRIEF DESCRIPTION OF DRAWINGS

FIG. 6 It depicts an explanatory diagram illustrating an example of a customer master and a product master to which attribute value columns have been newly added.

FIG. 11 It depicts an explanatory diagram illustrating an example of a case where a key column includes a plurality of columns.

FIG. 12 It depicts an explanatory diagram illustrating an example of a case where a relation value column includes a plurality of columns.

FIG. 13 It depicts an explanatory diagram illustrating an example of a table in which the relation value column is not explicitly indicated.

DESCRIPTION OF EMBODIMENTS

Hereinafter, exemplary embodiments of the present invention will be described with reference to the drawings.

Information defining the configuration of individual tables included in a relational database and a reference relationship between the tables is referred to as schema setting information. The schema setting information is created in advance by an analyst. Then, the individual tables included in the relational database are created in accordance with this schema setting information.

Before describing the present invention, an example of a relational database created in accordance with the schema setting information will be described.

Figure 1:
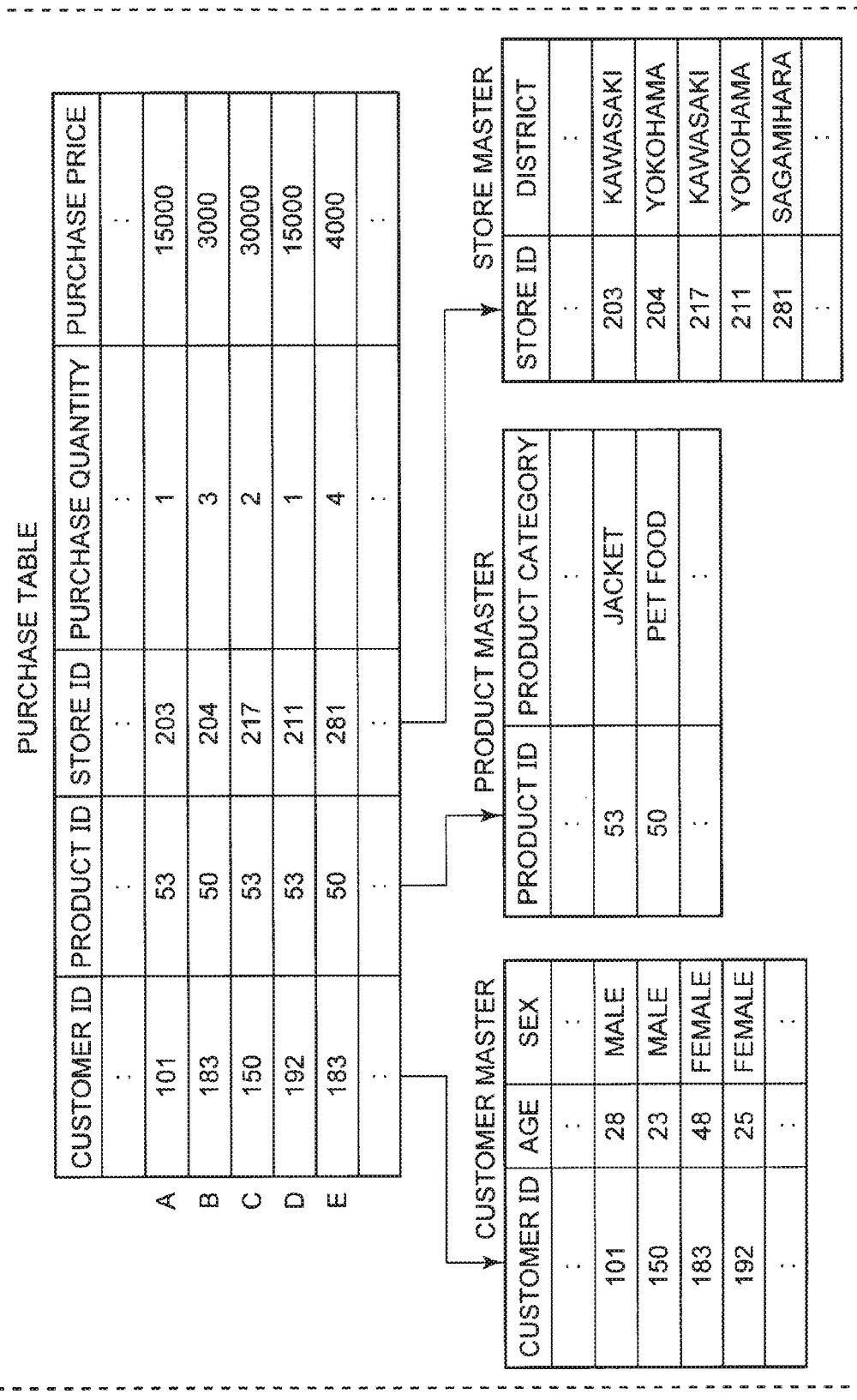
FIG. 1 It depicts an explanatory diagram illustrating an example of a relational database.

FIG. 1 is an explanatory diagram illustrating an example of the relational database (hereinafter, referred to as RDB). FIG. 1 illustrates a case where the RDB includes a purchase table, a customer master, a product master, and a store master as tables.

The purchase table represents a purchase record of an individual purchase. In the example illustrated in FIG. 1, a customer ID, a product ID, a store ID, a purchase quantity, and a purchase price are associated with each other in the purchase table. Therefore, each row of the purchase table illustrated in FIG. 1 indicates who purchased how many of which product at which store at what price.

The customer master represents the attribute of an individual customer. In the example illustrated in FIG. 1, the customer ID, the age, and the sex are associated with each other in the customer master. Therefore, each row of the customer master illustrated in FIG. 1 indicates the age and sex of each customer.

The product master represents the attribute of an individual product. In the example illustrated in FIG. 1, the product ID and a product category are associated with each other in the product master. Therefore, each row of the product master illustrated in FIG. 1 indicates the product category of each product.

The store master represents the attribute of an individual store. In the example illustrated in FIG. 1, the store ID and a district where the store is located are associated with each other in the store master. Therefore, each row of the store master illustrated in FIG. 1 indicates a district where each store is located.

In the example illustrated in FIG. 1, the purchase table corresponds to a fact table. Meanwhile, each of the customer master, the product master, and the store master corresponds to a master table.

In the example illustrated in FIG. 1, the customer ID in the purchase table serves as a reference source when the customer master is referred to, the product ID in the purchase table serves as a reference source when the product master is referred to, and the store ID in the purchase table serves as a reference source when the store master is referred to.

Such reference relationships and the configuration of individual tables are defined by the schema setting information created in advance by the analyst.

FIG. 1 illustrates an RDB in which the reference relationships are defined as a star schema, but the reference relationships in the RDB may be defined as a snowflake schema.

The individual tables have columns (refer to FIG. 1). The columns can be classified into a key column and a value column.

The key columns can be classified into a foreign key column and a primary key column. A specific value of a key held in the key column is referred to as a key value.

The foreign key column is a column holding a foreign key. The foreign key is a key that serves as a reference source when another table is referred to. In the example illustrated in FIG. 1, each of a "customer ID" column, a "product ID" column, and a "store ID" column of the purchase table corresponds to the foreign key column.

The primary key column is a column holding a primary key. The primary key is a key that serves as a reference destination when referred to from another table. In the example illustrated in FIG. 1, each of a "customer ID" column of the customer master, a "product ID" column of the product master, and a "store ID" column of the store master corresponds to the primary key.

The value column can be classified into a relation value column and an attribute value column.

The relation value column is a column holding a relation value. The relation value is a value representing a relationship between a plurality of key values. Therefore, the relation value is associated with a plurality of key values in a table. The "plurality of key values" mentioned here may be all foreign keys or may include a foreign key and a primary key. In the example illustrated in FIG. 1, each of a "purchase quantity" column and a "purchase price" column of the purchase table corresponds to the relation value column.

The attribute value column is a column holding an attribute value. The attribute value is a value representing the attribute of one primary key. Therefore, the attribute value is associated with one primary key in a table. In the example illustrated in FIG. 1, each of an "age" column and a "sex" column of the customer master, a "product category" column of the product master, and a "district" column of the store master corresponds to the attribute value column.

In addition, the tables can be classified into three classifications, for example, from a first table to a third table indicated below.

The first table is a table including two or more foreign key columns. An example of the first table is, for example, the fact table. In the example illustrated in FIG. 1, the purchase table corresponds to the first table.

The second table is a table including only one primary key column as a key column. An example of the second table is, for example, the master table. In the example illustrated in FIG. 1, each of the customer master, the product master, and the store master corresponds to the second table.

Figure 2:
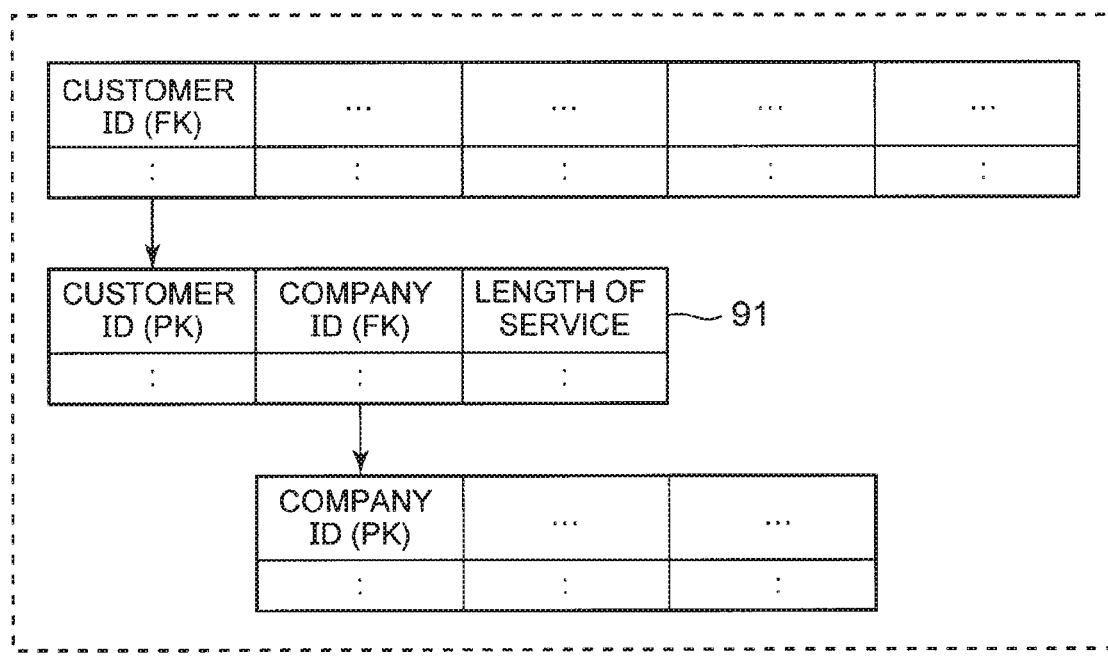
FIG. 2 It depicts an explanatory diagram illustrating an example of a third table.

The third table is a table having one primary key column and one or more foreign key columns. The third table is used, for example, in the snowflake schema. An example of the third table is illustrated in FIG. 2. In FIG. 2, a column labeled "FK" is the foreign key column and a column labeled "PK" is the primary key column. A table 91 illustrated in FIG. 2 includes one primary key column ("customer ID" column) and one foreign key column ("company ID" column). Therefore, the table 91 illustrated in FIG. 2 corresponds to the third table. FIG. 2 illustrates a case where the table 91 includes one foreign key column, but the number of foreign key columns included in the third table may be two or more.

A table having a plurality of key columns (whether to be the primary key column or the foreign key column is irrelevant) can have the relation value column. Therefore, the first table and the third table can have the relation value columns. The purchase table illustrated in FIG. 1 corresponds to the first table and has the "purchase quantity" column and the "purchase price" column as the relation value columns. Meanwhile, the table 91 exemplified in FIG. 2 corresponds to the third table and has a "length of service" column as the relation value column. However, a table having a plurality of key columns (whether to be the primary key column or the foreign key column is irrelevant) may not have any relation value column.

In addition, a table having the primary key column can have the attribute value column. Therefore, the second table and the third table can have the attribute value columns. Each of the customer master, the product master, and the store master illustrated in FIG. 1 corresponds to the second table and has the attribute value column. However, a table having the primary key column may not have the attribute value column. For example, the table 91 exemplified in FIG. 2 does not have the attribute value column.

In each of the exemplary embodiments indicated below, description will be given using as an example a case where the RDB exemplified in FIG. 1 is created on the basis of the schema setting information created in advance by the analyst. However, each column included in each table defined by the schema setting information is not limited to the example illustrated in FIG. 1. That is, the configuration of the tables defined by the schema setting information created in advance by the analyst is not limited to the example illustrated in FIG. 1. In addition, the reference relationships between the tables defined by the schema setting information is not limited to the example illustrated in FIG. 1. Furthermore, FIG. 1 has exemplified the purchase table, the product master, the customer master, and the store master, but the contents represented by the individual tables are also not particularly limited.

The present invention will be described on the premise of the above matters.

First Exemplary Embodiment

Figure 3:
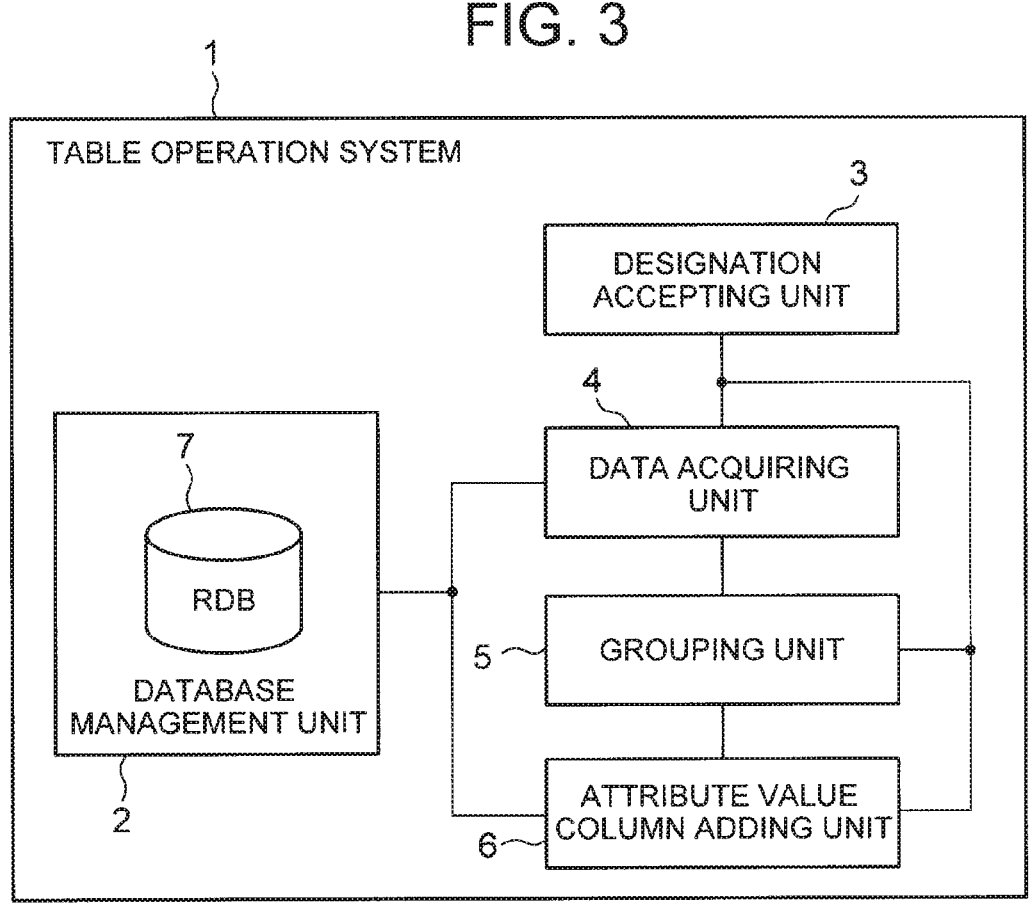
FIG. 3 It depicts a block diagram illustrating a configuration example of a table operation system of a first exemplary embodiment of the present invention.

FIG. 3 is a block diagram illustrating a configuration example of a table operation system of a first exemplary embodiment of the present invention. The table operation system 1 of the first exemplary embodiment includes a database management unit 2 (hereinafter simply referred to as DB management unit 2), a designation accepting unit 3, a data acquiring unit 4, a grouping unit 5, and an attribute value column adding unit 6.

The DB management unit 2 is a database management system (DBMS) that manages a relational database (RDB) 7. Reference relationships between tables included in the RDB 7 is defined by schema setting information created in advance by an analyst. The configuration of each table included in the RDB 7 is also defined by this schema setting information.

In the present invention, it is assumed that the RDB 7 in which the configuration of each table and the reference relationships between the tables are defined by the schema setting information includes a table having two or more foreign key columns and one or more relation value columns. In addition, it is assumed that this RDB 7 also includes individual tables to serve as reference destinations of these respective foreign key columns. The following description assumes that the RDB 7 in which the configuration of each table and the reference relationships between the tables are defined by the schema setting information is the RDB exemplified in FIG. 1. The purchase table illustrated in FIG. 1 corresponds to a "table having two or more foreign key columns and one or more relation value columns". In addition, all of the customer master, the product master, and the store master illustrated in FIG. 1 correspond to "individual tables to serve as reference destinations of respective foreign key columns".

As will be described later, the table operation system 1 performs processing of adding an attribute value column to some of these tables. Therefore, in some tables, an attribute value column not defined in the schema setting information is added.

The designation accepting unit 3 accepts designation of at least two foreign key columns in a table having two or more foreign key columns and one or more relation value columns (in this example, the purchase table) from an operator of the table operation system 1 (hereinafter simply referred to as operator). Furthermore, the designation accepting unit 3 also accepts designation of one relation value column in that table and designation of a type of a statistical model associated with this relation value column. Examples of the types of statistical models include a Poisson distribution and a Gaussian distribution but are not limited to these distributions. When designating the "purchase quantity" column of the purchase table as the relation value column, the operator can designate, for example, the Poisson distribution as the type of the statistical model to be associated with the "purchase quantity" column. Meanwhile, when designating the "purchase price" column of the purchase table as the relation value column, the operator can designate, for example, the Gaussian distribution as the type of the statistical model to be associated with the "purchase price" column.

The designation accepting unit 3 may display, for example, a graphical user interface (GUI) for the operator to input designation of the foreign key column, the relation value column, and the type of the statistical model on a display device (illustration is omitted in FIG. 3) and accept designation of the foreign key column, the relation value column, and the type of the statistical model via this GUI. In each exemplary embodiment, description will be given using as an example a case where the designation accepting unit 3 accepts designation of information via a GUI.

The following description will use as an example a case where the designation accepting unit 3 has accepted designation of the "customer ID" column and the "product ID" column from among the foreign key columns of the purchase table illustrated in FIG. 1. In addition, description will be given using as an example a case where the designation accepting unit 3 has accepted designation of the "purchase quantity" column from among the relation value columns of the purchase table illustrated in FIG. 1 and also accepted designation of the Poisson distribution as the type of the statistical model. However, the foreign key columns, the relation value columns, and the type of the statistical model designated by the operator are not limited to the above examples. Furthermore, the number of designated foreign key columns may be three or more.

The data acquiring unit 4 specifies individual tables to serve as reference destinations of respective foreign keys designated by the operator. Then, the data acquiring unit 4 acquires, from the RDB 7, a total value of the relation values in the designated relation value column for each combination of the key values in the primary key columns of the specified individual tables.

Processing of the data acquiring unit 4 will be described using a specific example. In this example, the "customer ID" column and the "product ID" column are designated as the foreign keys. The data acquiring unit 4 specifies the customer master as a table to serve as a reference destination of the "customer ID" column. The data acquiring unit 4 also specifies the product master as a table to serve as a reference destination of the "product ID" column. The data acquiring unit 4 then acquires the total value of the relation values in the designated relation value column for each combination of the key values in the primary key column of the customer master and the key values in the primary key column of the product master, from the table including this relation value column (in this example, the purchase table). In this example, the "purchase quantity" column is designated as the relation value column. Therefore, the data acquiring unit 4 acquires, from the purchase table, the total value of the purchase quantity for each combination of the key values in the primary key column of the customer master and the key values in the primary key column of the product master.

The primary key column of the customer master is the "customer ID" column in the customer master, while the primary key column of the product master is the "product ID" column in the product master. Hereinafter, an example of processing of acquiring the total value of the purchase quantity will be indicated using a combination of a customer ID "183" and a product ID "50" as an example of combinations of the key values in the above-mentioned primary key columns. The data acquiring unit 4 requests the DB management unit 2 to search for a row matching the combination of the customer ID "183" and the product ID "50" in the purchase table and return a sum value of purchase quantity values in these respective rows. In the example illustrated in FIG. 1, a row B and a row E are the rows matching the combination of the customer ID "183" and the product ID "50" in the purchase table. Therefore, the DB management unit 2 calculates a sum value "7" of a value "3" of the purchase quantity in the row B and a value "4" of the purchase quantity of the row E and returns a result of the calculation to the data acquiring unit 4 as the total value of the purchase quantity. As a result, the data acquiring unit 4 acquires the total value of the purchase quantity for the combination of the customer ID "183" and the product ID "50".

Here, a case where the data acquiring unit 4 acquires the total value of the purchase quantity is indicated using the combination of the customer ID "183" and the product ID "50" as an example. The data acquiring unit 4 similarly acquires the total value of the purchase quantity with respect to all combinations of the values of the customer ID and the product ID.

The data acquiring unit 4 can acquire the total value of the purchase quantity for each combination by generating an SQL requesting for the total value of the purchase quantity for each combination of the key values in the primary key column of the customer master (the customer ID in the customer master) and the key values in the primary key column of the product master (the product ID in the product master) and inputting this SQL to the DB management unit 2.

On the basis of the total value acquired by the data acquiring unit 4 for each combination of the key values in the primary key columns of the individual tables to serve as reference destinations of the designated respective foreign keys and the statistical model of the designated type, the grouping unit 5 groups the key values in the primary key columns of these individual tables.

Processing of the grouping unit 5 will be described using a specific example. The above example has indicated a case where the data acquiring unit 4 acquires the total value of the purchase quantity for each combination of the values of the customer ID and the product ID. In addition, the Poisson distribution is designated as the type of the statistical model. In this case, the grouping unit 5 groups the customer IDs in the customer master and the product IDs in the product master on the basis of the total value of the purchase quantity for each combination of the values of the customer ID and the product ID and the Poisson distribution.

Hereinafter, a group of the customer IDs is simply referred to as customer ID group. Likewise, a group of the product IDs is simply referred to as product ID group.

In addition, in order to simplify the explanation, the following description will use as an example a case where the grouping unit 5 groups the customer IDs and the product IDs such that each individual customer ID belongs to only one customer ID group and each individual product ID belongs to only one product ID group. Note that assigning a group in this manner such that one key value belongs to only one group is called clustering.

The customer ID will be represented by a sign "c". Meanwhile, the product ID will be represented by a sign "i".

In addition, the total value of the relation values corresponding to a combination of the customer ID "c" and the product ID "i" (the total value of the purchase quantity in this example) will be referred to as a total value $x_{c,i}$. For example, it is supposed that a total value "7" is obtained for a combination of a customer ID "183" and a product ID "50" as in the example described above. In this case, $x_{183,50}=7$ is established.

Figure 4:
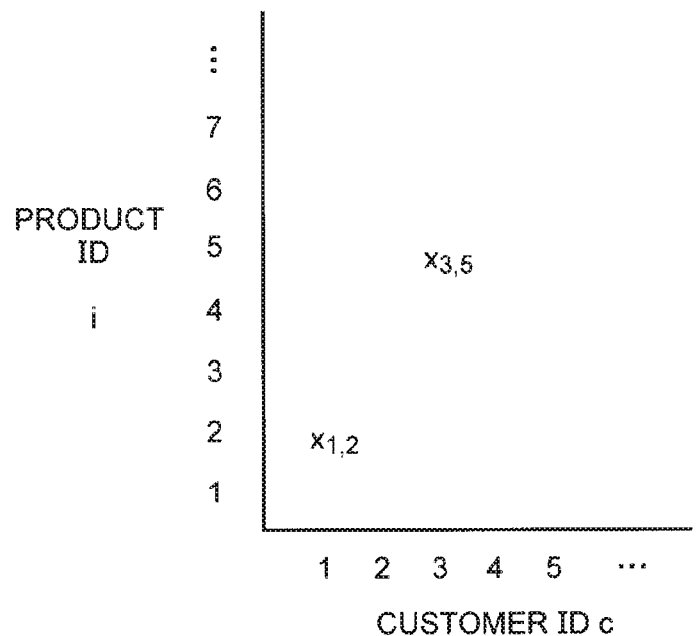
FIG. 4 It depicts a schematic diagram illustrating a state in which customer IDs and product IDs before grouping are arranged in order.

FIG. 4 illustrates a state in which the customer IDs and the product IDs before grouping are arranged in order. FIG. 4 indicates a state in which the customer IDs are arranged in order in a horizontal axis direction and the product IDs are arranged in order in a vertical axis direction. In addition, total values of the purchase quantity corresponding to combinations of the customer IDs and the product IDs are illustrated therein. For example, $x_{3,5}$ illustrated in FIG. 4 is a total value of the purchase quantity corresponding to a combination of a customer ID "3" and a product ID "5".

Figure 5:
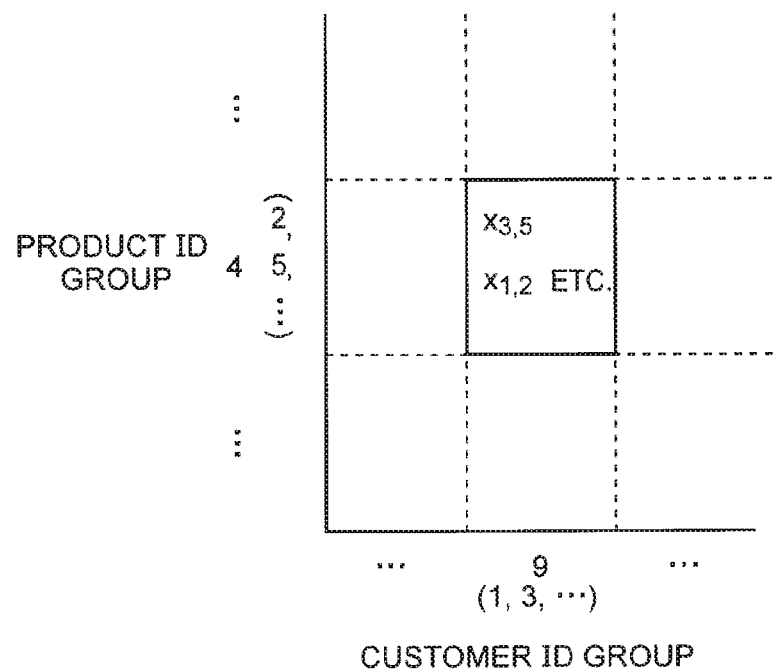
FIG. 5 It depicts an explanatory diagram schematically illustrating an example of a customer ID group and a product ID group that have been determined.

FIG. 5 is an explanatory diagram schematically illustrating an example of the customer ID group and the product ID group determined by the grouping unit 5. The grouping unit 5 separately determines a plurality of customer ID groups and product ID groups. However, in FIG. 5, only a customer ID group with an ID "9" and a product ID group with an ID "4" are illustrated in order to simplify the explanation. Each of the number of customer ID groups and the number of product ID groups may be assigned to a fixed value or may not be limited to a fixed value. Hereinafter, it is assumed that the number of customer ID groups is $K^C$ and the IDs of the respective customer ID groups are 1 to $K^C$. Likewise, it is assumed that the number of product ID groups is $K^I$ and the IDs of the respective product ID groups are 1 to $K^I$. Furthermore, when the ID of a customer ID group is "k" (k is one of 1 to $K^C$), this customer ID group is referred to as a customer ID group "k". This point similarly applies to the product ID groups as well.

In addition, in the example illustrated in FIG. 5, a customer ID and a product ID belonging to groups are indicated in parentheses. For example, customer IDs "1", "3", and so on belong to a customer ID group "9". Product IDs "2", "5", and so on belong to a product ID group "4".

A combination of one customer ID group and one product ID group corresponds to total values according to combinations of the customer IDs belonging to the one customer ID group and the product IDs belonging to the one product ID group. For example, in the example illustrated in FIG. 5, $x_{1,2}$, $x_{3,5}$, and so on correspond to a combination of the customer ID group "9" and the product ID group "4".

Note that FIG. 5 can be said to be a diagram obtained by modifying FIG. 4 such that the customer IDs belonging to the same customer ID group are consecutively arranged and the product IDs belonging to the same product ID group are consecutively arranged.

Computation when the grouping unit 5 determines the group will be described below.

Here, a customer ID group to which the customer ID "c" belongs is referred to as $z^C_c$. For example, when the customer ID "3" belongs to a customer ID group "1", this can be expressed as $z^C_3=1$. Alternatively, 4 may be expressed by a vector in which only elements corresponding to the ID of the customer ID group are allocated to 1 and the other elements are allocated to 0. For example, the above example may be expressed as $z^C_3=(1, 0, 0, 0, 0, \ldots)^T$.

Similarly, a product ID group to which the product ID "i" belongs is referred to as $z^I_i$. For example, when the product ID "2" belongs to the product ID group "4", this can be expressed as $z^I_2=4$. Alternatively, $z^I_i$ may be expressed by a vector in which only elements corresponding to the ID of the product ID group are allocated to 1 and the other elements are allocated to 0. For example, the above example may be expressed as $z^I_2=(0, 0, 0, 1, 0, \ldots)^T$.

In addition, the probability of the total value appearing under a parameter of a statistical model is referred to as $p(x_{c,i})$. Specifically, $p(x_{c,i})$ is expressed by following formula (1).

$$p(x_{c,i})=p(x_{c,i}|\theta(z^C_c,z^I_i)) \qquad \text{formula (1)}$$

In formula (1), $\theta(z^C_c,z^I_i)$ is a parameter of a distribution of the total values of the purchase quantity corresponding to a combination of the customer ID group "$z^C_c$" to which the customer ID "c" belongs and the product ID group "$z^I_i$" to which the product ID "i" belongs. This distribution is a distribution designated by the operator and, in this example, is the Poisson distribution. That is, in this example, $\theta(z^C_c,z^I_i)$ is a parameter of the Poisson distribution corresponding to the combination of "$z^C_c$" and "$z^I_i$". Additionally, $p(x_{c,i})$ is the probability of appearing under such a parameter of the Poisson distribution. Note that the parameter of the distribution is only required to be a parameter according to the type of the distribution. For example, the parameters of the Gaussian distribution are average and variance.

The grouping unit 5 uses formula (2) indicated below.

[Mathematical Formula 1]

$$\prod_{c \in S_c} \prod_{i \in S_i} p(x_{c,i} \mid \theta(z_c^C, z_i^I)) \qquad \text{formula (2)}$$

Formula (2) is the likelihood of a combination of each customer ID group to which the individual customer ID belongs, each product ID group to which the individual product ID belongs, and the parameter ($\theta(z_c^C, z_i^I)$) of the distribution according to the combination of the customer ID group and the product ID group. In addition, in formula (2), $S_c$ is a set of customer IDs and $S_i$ is a set of product IDs.

The grouping unit 5 determines each customer ID group and each product ID group using the likelihood calculated by formula (2). At this time, the grouping unit 5 also determines the parameter ($\theta(z_c^C, z_i^I)$) of the distribution according to the combination of the customer ID group and the product ID group for each combination.

For example, the grouping unit 5 can sequentially update $z_c^C$, $z_i^I$, and $\theta(z_c^C, z_i^I)$ in formula (2) such that the likelihood calculated by formula (2) increases and separately settle each customer ID group, each product ID group, and the parameter of the distribution according to the combination of the customer ID group and the product ID group.

In a case where each customer ID group, each product ID group, or the parameter is determined such that the likelihood is maximized when the elements in formula (2) are updated as described above, or in a case where a prior distribution is included into formula (2) and estimation (MAP estimation) for maximizing a posterior distribution is performed, the grouping unit 5 can use expectation-maximization (EM). The method of maximizing the likelihood is an example and the grouping unit 5 may use a method other than the method of maximizing the likelihood (for example, a variational Bayes method and a Gibbs sampling method) to determine each customer ID group, each product ID group, and so on.

By determining each customer ID group, the ID of a customer ID group to which an individual customer ID belongs can be associated with this individual customer ID in the customer master as an attribute value. Similarly, by determining each product ID group, the ID of a product ID group to which an individual product ID belongs can be associated with this individual product ID in the product master as an attribute value.

The attribute value column adding unit 6 adds, to each of the individual tables to serve as reference destinations of the designated respective foreign keys, an attribute value column of which attribute value is the ID of a group to which the key value in the primary key column of each of the individual tables belongs. In this example, the attribute value column adding unit 6 adds, to the customer master, an attribute value column of which attribute value is the ID of a customer ID group to which the customer ID belongs. Similarly, the attribute value column adding unit 6 adds, to the product master, an attribute value column of which attribute value is the ID of a product ID group to which the product ID belongs.

FIG. 6 illustrates an example of the customer master and the product master to which the attribute value columns have been newly added. Note that, in FIG. 6, the illustration of the purchase table and the store master illustrated in FIG. 1 is omitted. In this example, since the description has been given using as an example a case where the "customer ID" column and the "product ID" column are designated from among the foreign key columns, the attribute value columns are newly added to the customer master and the product master. If the "store ID" column is included in the designated foreign key columns, the attribute value column will be newly added to the store master to serve as a reference destination of the "store ID" column.

In this exemplary embodiment, the IDs of the customer ID groups and the IDs of the product ID groups are represented by numbers and accordingly, the attribute values in the added attribute value columns are also indicated by numbers. The IDs of the customer ID groups and the IDs of the product ID groups may be represented by names easy for the analyst to understand and such easily understandable names may be employed for the attribute values in the added attribute value columns. This point similarly applies to a second exemplary embodiment described later.

The DB management unit 2, the designation accepting unit 3, the data acquiring unit 4, the grouping unit 5, and the attribute value column adding unit 6 are realized by, for example, a CPU of a computer working in accordance with a program. In this case, the CPU simply reads a table operation program from a program recording medium such as a program storage device (illustration is omitted in FIG. 3) of the computer and, in accordance with this table operation program, works as the DB management unit 2, the designation accepting unit 3, the data acquiring unit 4, the grouping unit 5, and the attribute value column adding unit 6. Alternatively, the DB management unit 2, the designation accepting unit 3, the data acquiring unit 4, the grouping unit 5, and the attribute value column adding unit 6 may be separately realized by different pieces of hardware. These points similarly apply to the second exemplary embodiment described later.

In addition, the table operation system 1 may have a configuration in which two or more physically separated devices are connected by wired or wireless connection. This point also applies to the second exemplary embodiment described later.

Figure 7:
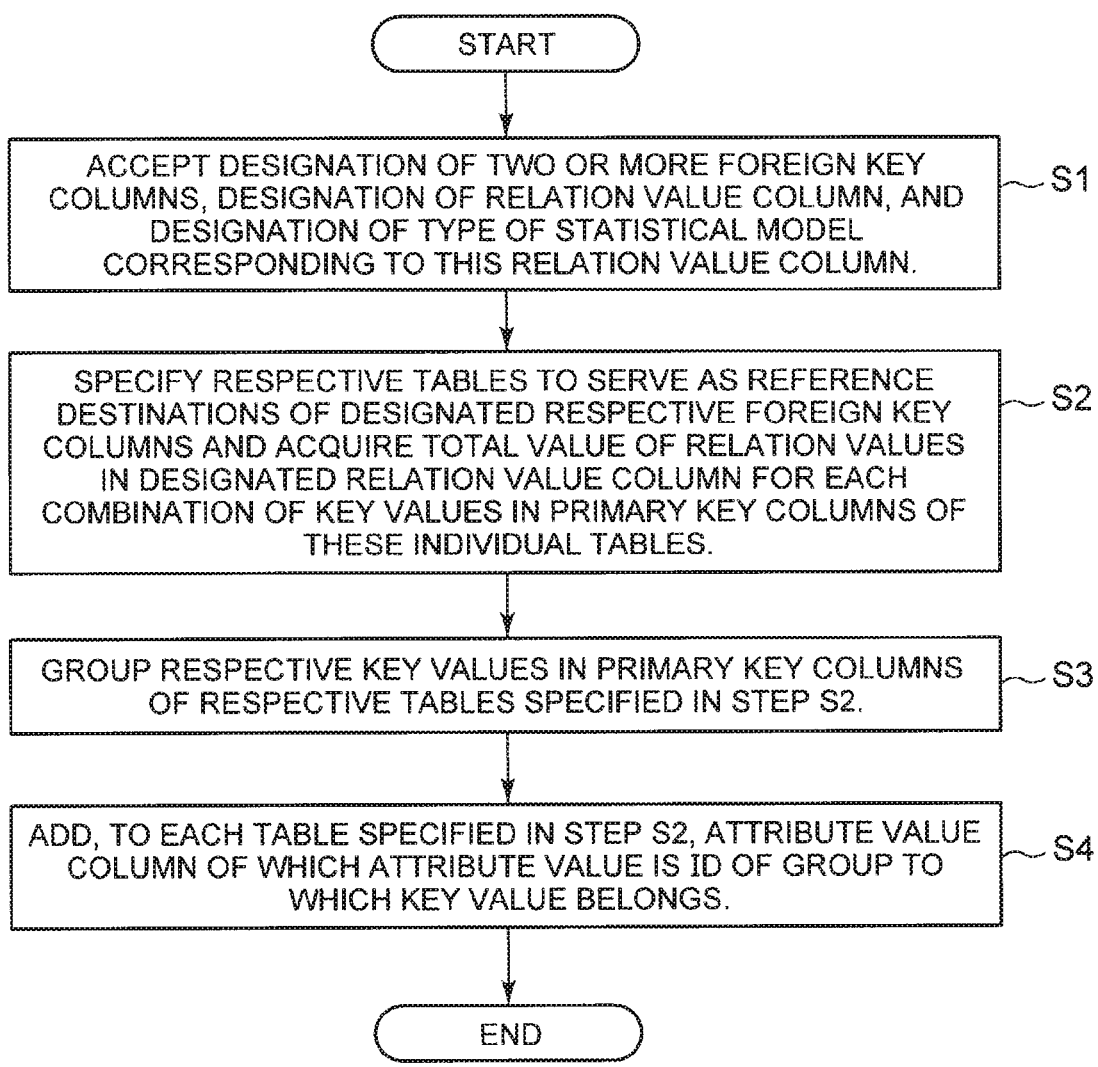
FIG. 7 It depicts a flowchart illustrating an example of processing progress according to the first exemplary embodiment of the present invention.

Next, processing progress will be described. FIG. 7 is a flowchart illustrating an example of processing progress according to the first exemplary embodiment of the present invention.

The designation accepting unit 3 accepts designation of at least two foreign key columns in a table having two or more foreign key columns and one or more relation value columns and also accepts designation of one relation value column in this table and designation of the type of a statistical model associated with this relation value column (step S1). In step S1, the designation accepting unit 3 displays a GUI for a user to input these items on a display device (illustration is omitted in FIG. 3) and accepts designation of each of the above items via this GUI. A specific example of the GUI will be described later.

The following description also uses as an example a case where the "customer ID" column and the "product ID" column of the purchase table illustrated in FIG. 1 are designated as the foreign key columns and the "purchase quantity" column of this purchase table is designated as the relation value column. In addition, a case where the Poisson distribution is designated as the type of the statistical model is taken as an example.

Next, the data acquiring unit 4 specifies respective tables to serve as reference destinations of the foreign key columns designated in step S1. In this example, the data acquiring unit 4 specifies the customer master and the product master (refer to FIG. 1), which are reference destinations of the "customer ID" column and the "product ID" column of the purchase table, respectively. Then, the data acquiring unit 4 acquires, from the purchase table of the RDB 7, a total value of the relation values in the designated relation value column for each combination of the key values in the primary key columns of these individual tables (step S2). In this example, the data acquiring unit 4 generates an SQL requesting for the total value of the purchase quantity for each combination of respective customer IDs held in the "customer ID" column of the customer master and respective product IDs held in the "product ID" column of the product master and inputs this SQL to the DB management unit 2. The DB management unit 2 executes processing of searching the purchase table (refer to FIG. 1) for a row matching the combination of the customer ID and the product ID in accordance with this SQL and calculating a sum value of the purchase quantity in the found row for each combination of the customer ID and the product ID. The DB management unit 2 returns the sum value of the purchase quantity calculated for each combination of the customer ID and the product ID to the data acquiring unit 4. As a result, the data acquiring unit 4 acquires the total value of the purchase quantity for each combination.

Next, the grouping unit 5 groups the respective key values in the primary key columns of the respective tables specified in step S2 (step S3). In this example, the grouping unit 5 sequentially updates the customer ID group ($z^C_c$) to which the individual customer ID belongs, the product ID group ($z^I_i$) to which the individual product ID belongs, and the parameter $\theta(z^C_c, z^I_i)$ of the Poisson distribution corresponding to the combination of "$z^C_c$" and "$z^I_i$" such that the likelihood calculated by formula (2) increases, thereby separately settling each customer ID group, each product ID group, and the parameter of the Poisson distribution according to the combination of the customer ID group and the product ID group.

Next, for each table specified in step S2, the attribute value column adding unit 6 adds an attribute value column of which attribute is the ID of a group to which the key value in the primary key column of each table belongs (step S4). In this example, the attribute value column adding unit 6 adds, to the customer master, an attribute value column of which attribute value is the ID of a customer ID group to which the customer ID belongs. Similarly, the attribute value column adding unit 6 adds, to the product master, an attribute value column of which attribute value is the ID of a product ID group to which the product ID belongs. As a result, as illustrated in FIG. 6, new attribute value columns are added to the customer master and the product master.

According to the present exemplary embodiment, the attribute value columns not defined in the schema setting information are added to tables to serve as reference destinations of the foreign key columns designated in step S1. Therefore, when causing a BI tool to present information matching the desired condition, the analyst can include the attribute value in the added attribute value column (the ID of a group to which the primary key belongs) into the condition. For example, if an analyst wishes to know the purchase quantity of a product belonging to a product ID group "11", which has been purchased by a customer belonging to a customer ID group "5", the analyst can designate a condition of "customer ID group "5"" with respect to the customer and a condition of "product ID group "11"" with respect to the product.

The grouping unit 5 groups the key values in the primary key columns such that the likelihood of the groups and the parameter increases. Each group obtained as a result thereof cannot be grasped by the analyst from the RDB 7 created in accordance with the schema setting information. In the present invention, the ID of such a group is added as a new attribute value to a table to serve as a reference destination. Therefore, according to the present invention, it becomes possible for the analyst to designate a condition that the analyst could not notice from the configuration of the tables defined in the schema setting information. As a result, the BI tool can extract more easily analyzable information from the RDB 7 to present to the analyst.

Note that the above description has described a case where two foreign key columns are designated by the operator. Three or more foreign key columns may be designated by the operator. For example, the "customer ID" column, the "product ID" column, and the "store ID" column of the purchase table (refer to FIG. 1) may be designated. In this case, the data acquiring unit 4 simply acquires the total value of the relation values for each combination of the customer IDs in the customer master, the product IDs in the product master, and the store IDs in the store master. In addition, the grouping unit 5 simply groups the customer IDs, the product IDs, and the store IDs separately. In this case, the grouping unit 5 can update the respective groups to which respective keys to be grouped belong and a parameter of a distribution according to the combination of these respective groups (the statistical model of the designated type) such that the likelihood of the respective groups and the parameter of the distribution according to the combination of the respective groups increases, thereby settling the respective groups and the parameter of the distribution according to the combination of the respective groups. More specifically, the grouping unit 5 simply updates a customer ID group to which the individual customer ID in the customer master belongs, a product ID group to which the individual product ID in the product master belongs, a store ID group to which the individual store ID in the store master belongs, and a parameter of a distribution according to the combination of the customer ID group, the product ID group, and the store ID group such that the likelihood thereof is increased, thereby settling each product ID group, each customer ID group, each store ID group, and the parameter of the distribution. Furthermore, the attribute value column adding unit 6 can newly add an attribute value column to each of the customer master, the product master, and the store master.

Second Exemplary Embodiment

Since a table operation system according to a second exemplary embodiment of the present invention can be represented by the block diagram illustrated in FIG. 3 like the table operation system of the first exemplary embodiment, the table operation system of the second exemplary embodiment will be described with reference to FIG. 3. Descriptions of matters similar to those of the first exemplary embodiment will be omitted as appropriate.

The table operation system 1 of the second exemplary embodiment includes a DB management unit 2, a designation accepting unit 3, a data acquiring unit 4, a grouping unit 5, and an attribute value column adding unit 6 (refer to FIG. 3).

The DB management unit 2 is similar to the DB management unit 2 in the first exemplary embodiment. Also in the second exemplary embodiment, description will be made on the assumption that an RDB 7 in which the configuration of each table and reference relationships between the tables are defined by the schema setting information is the RDB exemplified in FIG. 1.

The designation accepting unit 3 accepts designation of at least two foreign key columns in a table having two or more foreign key columns and one or more relation value columns and also accepts designation of one relation value column in this table and designation of the type of a statistical model associated with this relation value column. This action is similar to that in the first exemplary embodiment. In order to simplify the explanation, the present exemplary embodiment also use as an example a case where the "customer ID" column and the "product ID" column of the purchase table illustrated in FIG. 1 are designated as the foreign key columns and the "purchase quantity" column of this purchase table is designated as the relation value column. In addition, a case where the Poisson distribution is designated as the type of the statistical model is taken as an example.

In the second exemplary embodiment, the designation accepting unit 3 further accepts designation of an attribute value column included in a table to serve as a reference destination of one designated foreign key column and also accepts designation of the type of a statistical model associated with this attribute value column. Note that the number of attribute value columns designated in the second exemplary embodiment is one or more. There is a plurality of tables to serve as reference destinations of the designated foreign key columns but, among these tables, there may be a table of which attribute value column is not designated. In addition, the type of the statistical model is designated for each designated attribute value column.

It is assumed that the "customer ID" column and the "product ID" column of the purchase table are designated as the foreign key columns. Accordingly, a table to serve as a reference destination of this "customer ID" column is the customer master and a table to serve as a reference destination of the "product ID" column is the product master (refer to FIG. 1). Then, the customer master has the "age" column and the "sex" column as the attribute value columns, whereas the product master has the "product category" column as the attribute value column (refer to FIG. 1). The designation accepting unit 3 accepts designation of one or more attribute value columns from among the "age" column, the "sex" column, and the "product category" column.

In order to simplify the explanation, description will be given using as an example a case where the designation accepting unit 3 accepts designation of one attribute value column. In addition, a case where the one attribute value column is the "age" column will be described as an example. The operator can designate the type of the statistical model in accordance with the attribute value column to be designated. For example, in a case where the operator designates the "age" column as the attribute value column, the Gaussian distribution can be designated as the type of the statistical model to be associated with the "age" column. Hereinafter, description will be given using as an example a case where the Gaussian distribution is designated as the type of the statistical model to be associated with the "age" column.

Meanwhile, for example, in a case where the operator designates the "sex" column as the attribute value column, a Bernoulli distribution can be designated. Alternatively, for example, in a case where the operator designates the "product category" column as the attribute value column, a multinomial distribution can be designated.

The data acquiring unit 4 specifies individual tables to serve as reference destinations of the respective foreign keys designated by the operator. Then, the data acquiring unit 4 acquires, from the RDB 7, a total value of the relation values in the designated relation value column for each combination of the key values in the primary key columns of the specified individual tables. This action is similar to that in the first exemplary embodiment.

In the second exemplary embodiment, the data acquiring unit 4 further acquires the attribute value in the designated attribute value column for each key value in the primary key column of a table having this attribute value column. In this example, the "age" column is designated as the attribute value column. A table having the "age" column is the customer master and the primary key column of this customer master is the "customer ID" column (refer to FIG. 1). Therefore, in this case, the data acquiring unit 4 acquires the attribute value in the "age" column for each customer ID included in the customer master.

The data acquiring unit 4 can generate an SQL requesting for the attribute value in the designated attribute value column for each key value in the primary key column of a table having this attribute value column and input this SQL to the DB management unit 2, thereby acquiring the attribute value for each key value.

On the basis of the total value acquired for each combination of the key values in the primary key columns of the individual tables to serve as reference destinations of the designated respective foreign key columns, the statistical model of the type associated with the relation value column, the attribute value acquired for each key value in the primary key column of the table having the designated attribute value column, and the statistical model of the type associated with this attribute value column, the grouping unit 5 groups the key values in the primary key columns of these individual tables. In other words, the grouping unit 5 groups the key values in the primary key columns also using the attribute value in the designated attribute value column.

The age corresponding to the customer ID "c" is assumed as $a_c$. The probability of the age $a_c$ appearing under a parameter of a statistical model (in other words, the probability of the age corresponding to the customer ID "c" being $a_c$) is referred to as $p(a_c)$. Specifically, $p(a_c)$ is expressed by following formula (3).

$$p(a_c) = p(a_c | \alpha(z^C_c)) \qquad \text{formula (3)}$$

In formula (3), $\alpha(z^C_c)$ represents a parameter of the distribution of age corresponding to the customer ID group "$z^C_c$" to which the customer ID "c" belongs. This distribution is a statistical model of the type associated with the attribute value column. In addition, this type is designated by the operator. In this example, this distribution is a Gaussian distribution.

The grouping unit 5 uses formula (4) indicated below.

[Mathematical Formula 2]

$$\prod_{c \in S_c} \prod_{i \in S_i} p(x_{c,i}, a_c | \theta(z^C_c, z^I_i), \alpha(z^C_c)) \qquad \text{formula (4)}$$

Formula (4) is the likelihood of a combination of each customer ID group to which the individual customer ID belongs, each product ID group to which the individual product ID belongs, the parameter ($\theta(z^C_c, z^I_i)$) of the distribution according to the combination of the customer ID group and the product ID group, and the parameter ($\alpha(z^C_c)$) of the distribution according to the customer ID group.

The grouping unit 5 determines each customer ID group and each product ID group using the likelihood calculated by formula (4). At that time, the grouping unit 5 also determines the parameter ($\theta(z^C_c, z^I_i)$) of the distribution according to the combination of the customer ID group and the product ID group for each combination and additionally determines the parameter ($\alpha(z^C_c)$) of the distribution according to each customer ID group as well for each customer ID group.

For example, the grouping unit 5 can sequentially updates $z^C_c$, $z^I_i$, $\theta(z^C_c, z^I_i)$, and $\alpha(z^C_c)$ in formula (4) such that the likelihood calculated by formula (4) increases, thereby separately settling each customer ID group, each product ID group, the parameter of the distribution according to the combination of the customer ID group and the product ID group, and the parameter of the distribution according to the customer ID group.

The action of the grouping unit 5 to update each group and parameter such that the likelihood increases and settle each group and parameter is similar to the action in the first exemplary embodiment.

By determining each customer ID group, the ID of a customer ID group to which an individual customer ID belongs can be associated with this individual customer ID in the customer master as an attribute value. Similarly, by determining each product ID group, the ID of a product ID group to which an individual product ID belongs can be associated with this individual product ID in the product master as an attribute value.

The attribute value column adding unit 6 adds, to each of the individual tables to serve as reference destinations of the designated respective foreign keys, an attribute value column of which attribute value is the ID of a group to which the key value in the primary key column of each of the individual tables belongs. The action of the attribute value column adding unit 6 in the second exemplary embodiment is similar to the action of the attribute value column adding unit 6 in the first exemplary embodiment. In this example, the attribute value column adding unit 6 adds, to the customer master, an attribute value column of which attribute value is the ID of a customer ID group to which the customer ID belongs. Similarly, the attribute value column adding unit 6 adds, to the product master, an attribute value column of which attribute value is the ID of a product ID group to which the product ID belongs. As a result, as exemplified in FIG. 6, the customer master and the product master to which the attribute value columns have been newly added are obtained.

Figure 8:
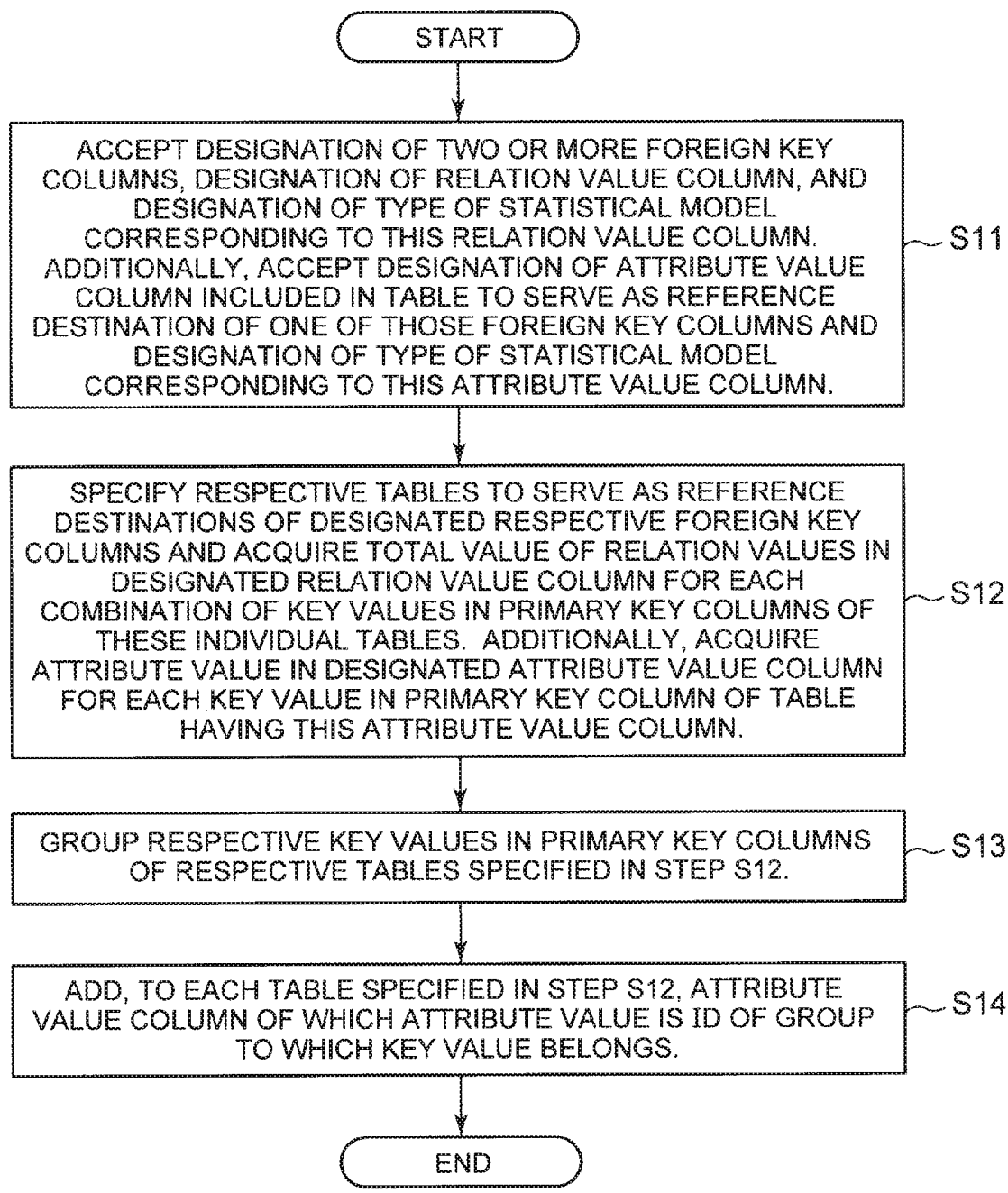
FIG. 8 It depicts a flowchart illustrating an example of processing progress according to a second exemplary embodiment of the present invention.

Next, processing progress will be described. FIG. 8 is a flowchart illustrating an example of processing progress according to the second exemplary embodiment of the present invention.

The designation accepting unit 3 accepts designation of at least two foreign key columns in a table having two or more foreign key columns and one or more relation value columns and also accepts designation of one relation value column in this table and designation of the type of a statistical model associated with this relation value column. Additionally, the designation accepting unit 3 accepts designation of an attribute value column included in a table to serve as a reference destination of one of those foreign key columns and designation of the type of a statistical model associated with this attribute value column (step S11). The designation accepting unit 3 displays a GUI for a user to input these items on a display device (illustration is omitted in FIG. 3) and accepts designation of each of the above items via this GUI. A specific example of the GUI will be described later.

The following description also uses as an example a case where the "customer ID" column and the "product ID" column of the purchase table illustrated in FIG. 1 are designated as the foreign key columns and the "purchase quantity" column of this purchase table is designated as the relation value column. In addition, a case where the Poisson distribution is designated as the type of the statistical model associated with the relation value column is taken as an example. Additionally, a case where the "age" column is designated as the attribute value column and the Gaussian distribution is designated as the type of the statistical model associated with the attribute value column will be taken as an example.

In next step S12, the data acquiring unit 4 specifies respective tables to serve as reference destinations of the foreign key columns designated in step S11. In this example, the data acquiring unit 4 specifies the customer master and the product master (refer to FIG. 1), which are reference destinations of the "customer ID" column and the "product ID" column of the purchase table, respectively. Then, the data acquiring unit 4 acquires, from the purchase table of the RDB 7, a total value of the relation values in the designated relation value column for each combination of the key values in the primary key columns of these individual tables. This action is similar to that in step S2 in the first exemplary embodiment.

In step S12, the data acquiring unit 4 further acquires the attribute value in the designated attribute value column for each key in the primary key column of a table having this attribute value column (step S12). A table having the "age" column designated as the attribute value column is the customer master (refer to FIG. 1). Therefore, in this example, the data acquiring unit 4 acquires the attribute value in the "age" column for each customer ID held in the "customer ID" column of the customer master. The data acquiring unit 4 generates an SQL requesting for the attribute value in the "age" column for each customer ID held in the "customer ID" column of the customer master and inputs this SQL to the DB management unit 2. In accordance with this SQL, the DB management unit 2 executes processing of extracting the attribute value in the "age" column for each customer ID held in the "customer ID" column of the customer master and returns the attribute value in the "age" column that has been extracted for each customer ID to the data acquiring unit 4. As a result, the data acquiring unit 4 acquires the attribute value of each customer ID.

Next, the grouping unit 5 groups the respective key values in the primary key columns of the respective tables specified in step S12 (the customer master and the product master) (step S13). In this example, the grouping unit 5 sequentially updates the customer ID group ($z^C_c$) to which the individual customer ID belongs, the product ID group ($z^I_i$) to which the individual product ID belongs, the parameter $\theta(z^C_c, z^I_i)$ of the Poisson distribution corresponding to the combination of "$z^C_c$" and "$z^I_i$", and the parameter $\alpha(z^C_c)$ of the Gaussian distribution corresponding to "$z^C_c$" such that the likelihood calculated by formula (4) increases, thereby separately settling each customer ID group, each product ID group, the parameter of the Poisson distribution according to the combination of the customer ID group and the product ID group, and the parameter of the Gaussian distribution according to the customer ID group.

Next, the attribute value column adding unit 6 adds, to each table specified in step S12, an attribute value column of which attribute is the ID of a group to which the key value in the primary key column of each table belongs (step S14). The processing in step S14 is similar to the processing in step S4 of the first exemplary embodiment. As a result, as illustrated in FIG. 6, new attribute value columns are added to the customer master and the product master.

Also in the second exemplary embodiment, an effect similar to that of the first exemplary embodiment is obtained. In particular, in the second exemplary embodiment, when the key values in the primary key column of a table to serve as a reference destination of the designated foreign key are grouped, the grouping is performed by considering the designated attribute value column. Therefore, the accuracy of grouping the key values in the primary key column is improved. As a result, the analyst can more appropriately designate a condition for obtaining easily analyzable information.

In the above second exemplary embodiment, the description has been given using as an example a case where the "age" column of the customer master is designated as the attribute value column. The "age" column is an example of the attribute value column and an attribute value column other than the "age" column may be designated. In addition, the number of attribute value columns designated by the operator may be two or more. The grouping unit 5 is only required to perform the grouping in step S13 using a calculation formula for the likelihood according to the designated attribute value column.

Next, a GUI displayed in the first exemplary embodiment and the second exemplary embodiment when the designation accepting unit 3 accepts designation of a variety of items will be described. A common GUI can be used in the first exemplary embodiment and the second exemplary embodiment.

Figure 9:
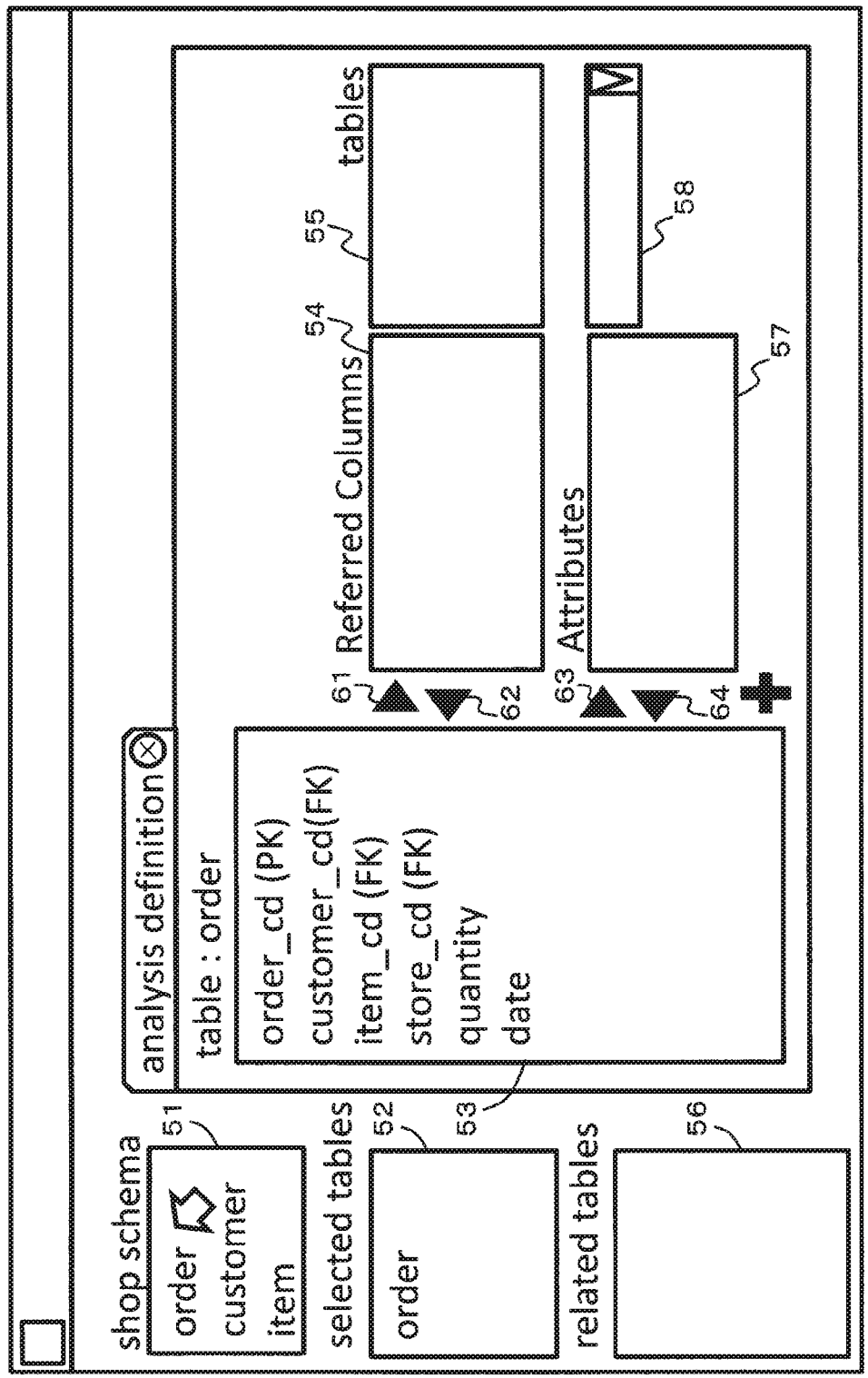
FIG. 9 It depicts an explanatory diagram illustrating an example of a GUI used in the present invention.
Figure 10:
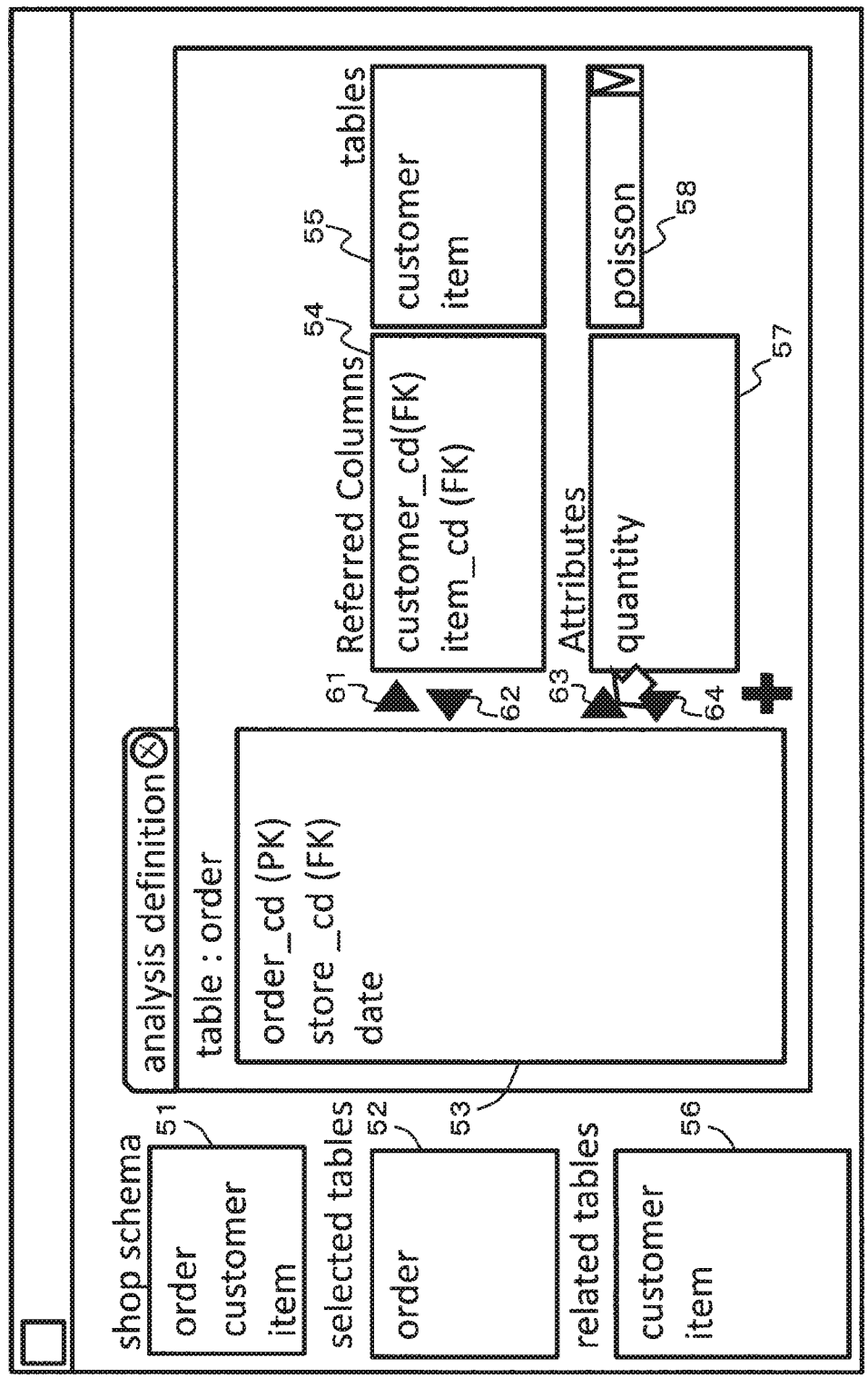
FIG. 10 It depicts an explanatory diagram illustrating an example of a GUI used in the present invention.

FIGS. 9 and 10 are explanatory diagrams illustrating examples of a GUI used in the present invention. A screen used as a GUI includes, for example, a table name display field 51, a selected table name display field 52, a column name display field 53, a first selected column name display field 54, reference destination table name display fields 55 and 56, a second selected column name display field 57, a type selection field 58, and buttons 61 to 64.

The selected table name display field 52, the column name display field 53, the first selected column name display field 54, the reference destination table name display fields 55 and 56, the second selected column name display field 57, and the type selection field 58 are blank in an initial state.

The table name display field 51 is a field that displays the table name of each table. The designation accepting unit 3 displays the table names of the respective tables defined in the schema setting information in the table name display field 51. FIGS. 9 and 10 exemplify a state in which the designation accepting unit 3 displays three table names such as "order" in the table name display field 51.

The selected table name display field 52 is a field that displays the table name selected by the operator. For example, when a click operation is performed on one table name from among the table names displayed in the table name display field 51, the designation accepting unit 3 judges that the one table name has been selected and displays this one table name in the selected table name display field 52. FIGS. 9 and 10 exemplify a state in which the designation accepting unit 3 displays the table name "order" in the selected table name display field 52 as a result of the operator clicking "order" in the table name display field 51.

The column name display field 53 is a field that displays the column name of each column included in a table indicated by the selected table name. FIGS. 9 and 10 exemplify a state in which the designation accepting unit 3 displays the column names of respective columns included in a table having a table name of "order" in the column name display field 53. In FIGS. 9 and 10, a sign "PK" is affixed to the column name of the primary key column and a sign "FK" is affixed to the column name of the foreign key column.

The first selected column name display field 54 is a field that displays the column name of the selected foreign key column. A foreign key column of which column name is displayed in the first selected column name display field 54 is a foreign key column designated by the operator. The selection operation (in other words, the designation operation) for the foreign key column is, for example, an operation of clicking the column name of the foreign key column displayed in the column name display field 53 and subsequently clicking the button 61. When such an operation is performed, the designation accepting unit 3 displays the column name of this foreign key column in the first selected column name display field 54 and deletes this column name from the column name display field 53. The operator performs the above-described selection operation on at least two foreign key columns and the designation accepting unit 3 judges that these foreign key columns have been designated. FIG. 10 exemplifies a state in which a foreign key column having a column name of "customer_cd" and a foreign key column having a column name of "item_cd" are designated by the operator.

Note that, when canceling the designation of the foreign key column, the operator is only required to click the column name of the foreign key column of which designation is to be canceled from among the column names displayed in the first selected column name display field 54 and subsequently click the button 62. When such an operation is performed, the designation accepting unit 3 deletes the column name of this foreign key column from the first selected column name display field 54 and displays this column name again in the column name display field 53.

The designation accepting unit 3 also displays the table name of a table to serve as a reference destination of the foreign key column of which column name is displayed in the first selected column name display field 54 (that is, the foreign key column designated by the operator) in the reference destination table name display fields 55 and 56. FIG. 10 exemplifies a state in which a table name "customer" of a table to serve as a reference destination of the foreign key column having the column name of "customer_cd" and a table name "item" of a table to serve as a reference destination of the foreign key column having the column name of "item_cd" are displayed in the reference destination table name display fields 55 and 56. By viewing the reference destination table name display fields 55 and 56, the operator can grasp a table to serve as a reference destination of the designated foreign key column.

The second selected column name display field 57 is a field that displays the column name of the selected relation value column or the column name of the selected attribute value column. A value column of which column name is displayed in the second selected column name display field 57 is a relation value column or an attribute value column designated by the operator.

The selection operation (in other words, the designation operation) for the relation value column is, for example, an operation of clicking the column name of the relation value column displayed in the column name display field 53 and subsequently clicking the button 63. When such an operation is performed, the designation accepting unit 3 displays the column name of this relation value column in the second selected column name display field 57 and deletes this column name from the column name display field 53. The operator performs the above-described selection operation on one relation value column and the designation accepting unit 3 judges that this relation value column has been designated.

The type selection field 58 is a field for selecting the type of the statistical model corresponding to the value column indicated by the column name displayed in the second selected column name display field 57. In the example illustrated in FIG. 10, a case where the type selection field 58 is a pull-down menu is exemplified. By operating the type selection field 58, the operator can select the type of the statistical model corresponding to the value column indicated by the column name displayed in the second selected column name display field 57. When this operation is performed, the designation accepting unit 3 judges that the type of the statistical model corresponding to the value column indicated by the column name displayed in the second selected column name display field 57 has been designated.

In the example illustrated in FIG. 10, a case where a relation value column having a column name of "quantity" is designated and the Poisson distribution is designated as a type of a statistical model corresponding to this relation value column is exemplified.

The selection operation for the attribute value column and the selection operation for the type of the statistical model corresponding to the attribute value column are similar to the selection operation for the relation value column and the selection operation for the type of the statistical model corresponding to the relation value column. For example, the operator is only required to click the column name of the attribute value column displayed in the column name display field 53 and click the button 63. When such an operation is performed, the designation accepting unit 3 displays the column name of this attribute value column in the second selected column name display field 57 and deletes this column name from the column name display field 53. The operator performs the above-described operation on an attribute value column to be selected and the designation accepting unit 3 judges that this attribute value column has been designated.

In addition, by operating the type selection field 58 while the designated attribute value column is displayed in the second selected column name display field 57, the operator can select the type of the statistical model corresponding to the attribute value column. When this operation is performed, it is judged that the type of the statistical model corresponding to the attribute value column displayed in the second selected column name display field 57 has been selected.

Note that, in the first exemplary embodiment, even when the selection operation for the attribute value column and the selection operation for the type of the statistical model corresponding to this attribute value column are performed, the table operation system 1 may not use these attribute value column and statistical model.

In addition, when canceling the designation of the relation value column or the attribute value column, the operator is only required to click the column name of the relation value column or the column name of the attribute value column displayed in the second selected column name display field 57 and subsequently click the button 64. When such an operation is performed, the designation accepting unit 3 deletes the column name of this relation value column or the column name of this attribute value column from the second selected column name display field 57 and displays this column name again in the column name display field 53.

In the first exemplary embodiment and the second exemplary embodiment, the designation accepting unit 3 can accept designation of a variety of items through the GUI as described above. However, the GUI is not limited to the GUIs exemplified in FIGS. 9 and 10. In addition, the designation accepting unit 3 may accept designation of a variety of items without using a GUI.

Furthermore, each of the above-described exemplary embodiments has described as an example a case where the grouping unit 5 performs the grouping such that one key value belongs to only one group. The grouping unit 5 may group the key values by permitting one key value to belong to a plurality of groups. For example, in the example indicated in each of the above exemplary embodiments, the grouping unit 5 may determine the customer ID group and the product ID group in such a manner that each individual customer ID belongs to one or a plurality of customer ID groups and each individual product ID belongs to one or a plurality of product ID groups.

Meanwhile, in the present invention, the key column may include a plurality of columns. When the key column includes a plurality of columns, for example, the key value may be represented by a vector. FIG. 11 is an explanatory diagram illustrating an example of a case where the key column includes a plurality of columns. FIG. 11 exemplifies a key column for uniquely identifying individual employees belonging to a group company. The key column exemplified in FIG. 11 includes a "company ID" column and an "in-company employee ID" column. There is a case where a plurality of companies forming the group company uses the same in-company employee ID. For example, as illustrated in FIG. 11, it is supposed that there are different employees having the same in-company employee ID "12345" in a company "1001" and a company "1002". In such a case, it is not possible to uniquely identify each individual employee belonging to the group company when only the in-company employee ID is employed. However, each individual employee belonging to the group company can be uniquely identified using the combination of the "company ID" column and the "in-company employee ID" column as the key column. For example, in the example illustrated in FIG. 11, respective different employees can be uniquely identified by a key value of (1001,12345) and a key value of (1002, 12345). FIG. 11 has exemplified a case where the key column includes two columns, but the key column may include three or more columns.

In addition, in the present invention, the relation value column may include a plurality of columns. When the relation value column includes a plurality of columns, for example, the relation value may be represented by a vector. FIG. 12 is an explanatory diagram illustrating an example of a case where the relation value column includes a plurality of columns. FIG. 12 exemplifies a relation value column holding the number of purchases. Additionally, a case where the relation value column holding the number of purchases includes a "daytime number of purchases" column and a "nighttime number of purchases" column is exemplified. For example, the purchase quantity in a row P illustrated in FIG.

12 can be represented by a vector of (12,5). Similarly, the purchase quantity in a row Q illustrated in FIG. 12 can be represented by a vector of (7,10). FIG. 12 has exemplified a case where the relation value column includes two columns, but the relation value column may include three or more columns.

Furthermore, when the relation value column is not explicitly indicated in a table having a plurality of key columns, the table may be regarded that a relation value column is present therein. FIG. 13 is an explanatory diagram illustrating an example of a table in which the relation value column is not explicitly indicated. The table illustrated in FIG. 13 includes a "customer ID" column and a "company ID" column as the key columns. The "company ID" column holds the ID of a company for which a person specified by the customer ID is working.

In FIG. 13, the relation value column is not explicitly indicated. However, FIG. 13 can be regarded that there is a relation value column that holds a relation value of "whether there is employment relationship between customer and company". The relation value of "whether there is employment relationship between customer and company" is obtained as one of binary values (in this example, the binary values are assumed as "0" and "1"). Here, when there is an employment relationship between a customer identified by the customer ID and a company identified by the company ID, the value of the relation value in this case is "1" and, when there is no employment relationship therebetween, the value of the relation value in this case is "0". In a row where the key values are held in both of the "customer ID" column and the "company ID" column, the relation value of "whether there is employment relationship between customer and company" is "1". Therefore, it can be regarded that a relation value column in which "1" is held as the relation value of "whether there is employment relationship between customer and company" is present for all the rows exemplified in FIG. 13. Meanwhile, for example, it is supposed that a row in which the customer ID "180" and the company ID "1355" are associated with each other does not exist in the table exemplified in FIG. 13. In this case, the relation value of "whether there is employment relationship between customer and company" is "0" in regard to the relationship between the customer ID "180" and the company ID "1355".

Figure 14:
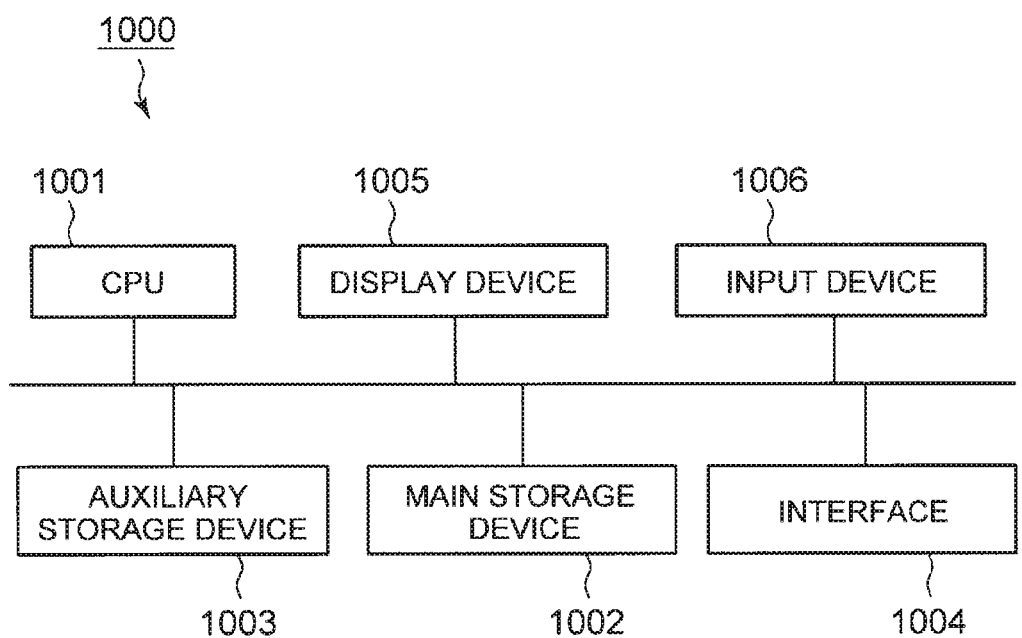
FIG. 14 It depicts an overview block diagram illustrating a configuration example of a computer according to each exemplary embodiment of the present invention.

FIG. 14 is an overview block diagram illustrating a configuration example of a computer according to each exemplary embodiment of the present invention. The computer 1000 includes a CPU 1001, a main storage device 1002, an auxiliary storage device 1003, an interface 1004, a display device 1005, and an input device 1006.

The table operation system of each exemplary embodiment is implemented in the computer 1000. The action of the table operation system is stored in the auxiliary storage device 1003 in the form of a program (table operation program). The CPU 1001 retrieves the program from the auxiliary storage device 1003 to develop in the main storage device 1002 and executes the above processing in accordance with this program.

The auxiliary storage device 1003 is an example of a non-transitory tangible medium. Other examples of non-transitory tangible media include magnetic disks, magneto-optical disks, CD-ROMs, DVD-ROMs, and semiconductor memories connected via the interface 1004. In addition, when this program is delivered to the computer 1000 via a communication line, the computer 1000 that has received the delivery may develop the program in the main storage device 1002 and execute the above processing.

Meanwhile, the program may be for realizing a part of the above-described processing. Additionally, the program may be a differential program that realizes the above-described processing in combination with another program already stored in the auxiliary storage device 1003.

Figure 15:
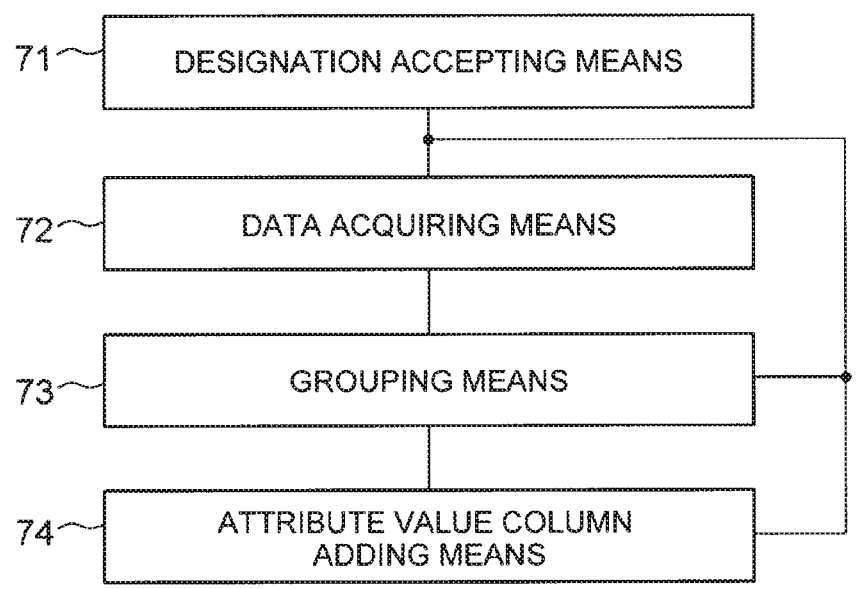
FIG. 15 It depicts a block diagram illustrating the outline of the present invention.
Figure 16:
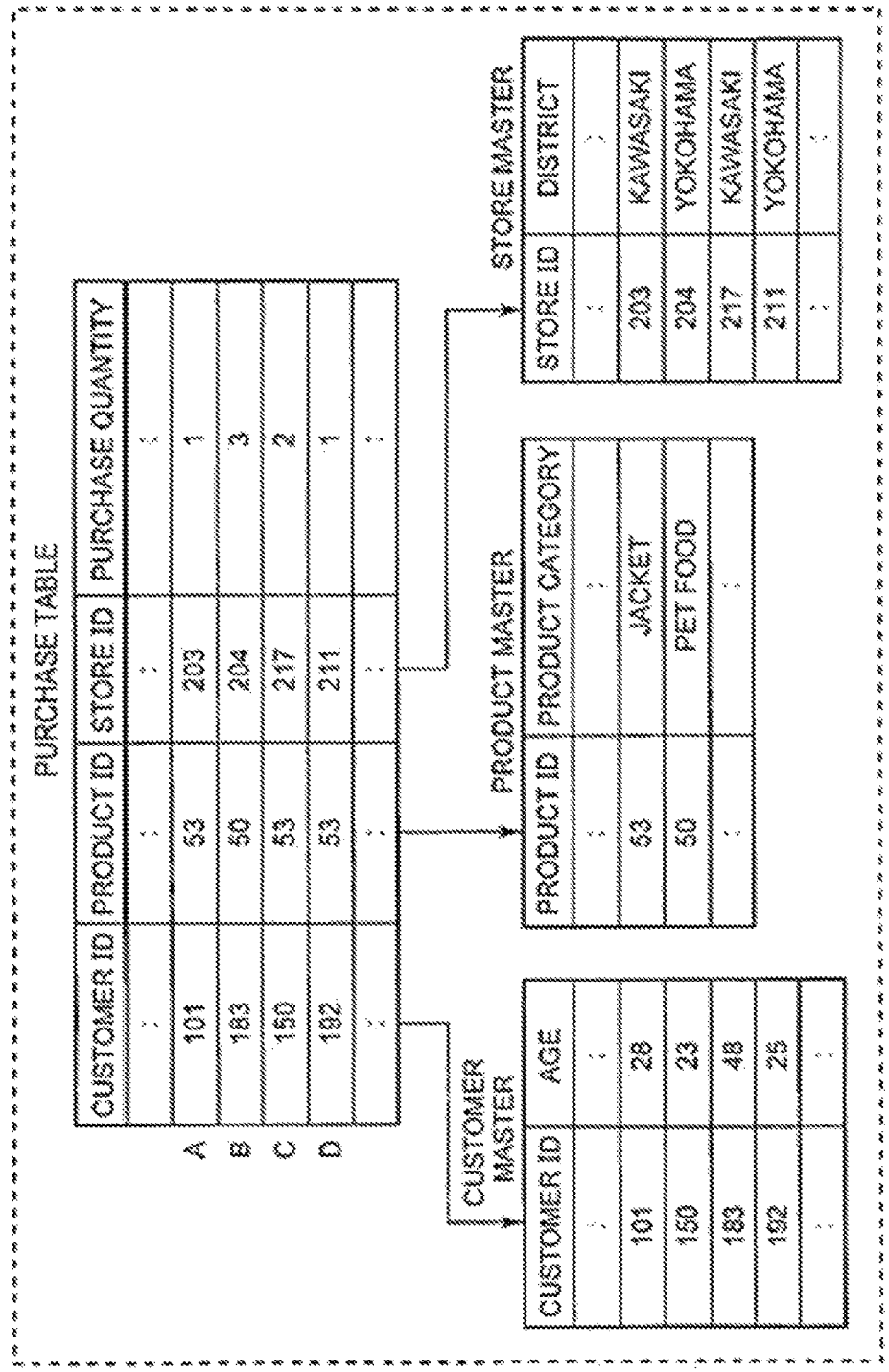
FIG. 16 It depicts a schematic diagram illustrating various tables included in a database.
Figure 17:
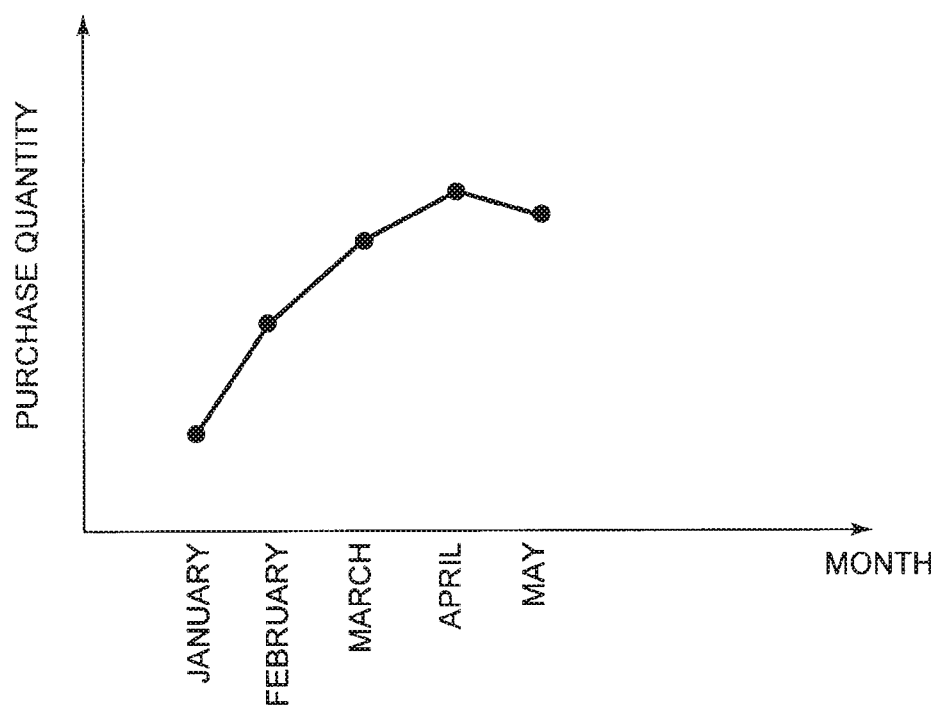
FIG. 17 It depicts a schematic diagram illustrating a display example by a BI tool.

Next, the outline of the present invention will be described. FIG. 15 is a block diagram illustrating the outline of the present invention. The table operation system of the present invention includes a designation accepting means 71, a data acquiring means 72, a grouping means 73, and an attribute value column adding means 74.

The designation accepting means 71 (for example, the designation accepting unit 3) accepts designation of at least two foreign key columns, designation of a relation value column, and designation of the type of a statistical model associated with this relation value column in a table having two or more foreign key columns and one or more relation value columns.

The data acquiring means 72 (for example, the data acquiring unit 4) specifies individual tables to serve as reference destinations of the designated respective foreign key columns and, for each combination of the key values in the primary key columns of the specified individual tables, acquires a total value of the relation values in the relation value column.

The grouping means 73 (for example, the grouping unit 5) groups the respective key values in the primary key columns of the individual tables on the basis of the total value acquired for each combination of the key values in the primary key columns of the individual tables and the statistical model of the designated type.

The attribute value column adding means 74 (for example, the attribute value column adding unit 6) adds, to each individual table, an attribute value column of which attribute value is identification information on a group to which each key value in each primary key column of each individual table belongs.

With such a configuration, it is possible to alter the configuration of the table such that a condition for obtaining more easily analyzable information can be designated.

A configuration may be employed in which the designation accepting means 71 accepts designation of an attribute value column included in a table to serve as a reference destination of one of the designated foreign key columns and designation of a type of a statistical model associated with the attribute value column, the data acquiring means 72 acquires an attribute value in the designated attribute value column for each key value in a primary key column of the table having the attribute value column, and the grouping means 73 groups the respective key values in the primary key columns of the individual tables on the basis of a total value acquired for each combination of the key values in the primary key columns of the individual tables to serve as reference destinations of the designated respective foreign key columns, the statistical model of the type associated with the relation value column, the attribute value acquired for each key value in the primary key column of the table having the attribute value column, and the statistical model of the type associated with the attribute value column.

In addition, the designation accepting means 71 may be configured to display a screen including a table name display field that displays a table name of each table (for example, the table name display field 51), a column name display field that displays a column name of each column included in a table indicated by a selected table name (for example, the column name display field 53), a selected column name display field that displays a column name of a selected relation value column or a column name of a selected attribute value column (for example, the second selected column name display field 57), and a type selection field for selecting a type of a statistical model corresponding to a column name displayed in the selected column name display field (for example, the type selection field 58), accept designation of at least two foreign key columns when column names of the at least two foreign key columns are selected from among column names displayed in the column name display field, accept designation of a relation value column and designation of a type of a statistical model associated with the relation value column when a column name of the relation value column is selected from among column names displayed in the column name display field and the type of the statistical model is selected in the type selection field, and accept designation of an attribute value column and designation of a type of a statistical model associated with the attribute value column when a column name of the attribute value column is selected from among column names displayed in the column name display field and the type of the statistical model is selected in the type selection field.

Meanwhile, the grouping means 73 may be configured to group the key values such that one key value belongs to only one group.

Alternatively, the grouping means 73 may be configured to group the key values by permitting one key value to belong to a plurality of groups.

Although the invention of the present application has been described with reference to the exemplary embodiments, the invention of the present application is not limited to the above-described exemplary embodiments. Various modifications that can be understood by those skilled in the art within the scope of the invention of the present application can be made to the configuration and details of the invention of the present application.

INDUSTRIAL APPLICABILITY

The present invention is suitably applied to a table operation system which operates a table of a predetermined database.

REFERENCE SIGNS LIST

1 Table operation system
2 Database management unit (DB management unit)
3 Designation accepting unit
4 Data acquiring unit
5 Grouping unit
6 Attribute value column adding unit

The invention claimed is:

1. A table operation system comprising:
a designation accepting unit, implemented by a processor, configured to accept designation of at least two foreign key columns, designation of a relation value column, and designation of a type of a statistical model associated with the relation value column in a table having two or more foreign key columns and one or more relation value columns;
a data acquiring unit, implemented by the processor, configured to specify individual tables to serve as reference destinations of the designated respective foreign key columns and acquire a total value of relation values in the relation value column for each combination of key values in primary key columns of the specified individual tables;
a grouping unit, implemented by the processor, configured to group the respective key values in the primary key columns of the individual tables on the basis of the total value acquired for each combination of the key values in the primary key columns of the individual tables and the statistical model of the designated type; and
an attribute value column adding unit, implemented by the processor, configured to add, to each individual table, an attribute value column of which attribute value is identification information on a group to which each key value in each primary key column of each individual table belongs,
wherein,
the designation accepting unit accepts designation of an attribute value column included in a table to serve as a reference destination of one of the designated foreign key columns and designation of a type of a statistical model associated with the attribute value column,
the data acquiring unit acquires an attribute value in the designated attribute value column for each key value in a primary key column of the table having the attribute value column, and
the grouping unit groups the respective key values in the primary key columns of the individual tables on the basis of a total value acquired for each combination of the key values in the primary key columns of the individual tables to serve as reference destinations of the designated respective foreign key columns, the statistical model of the type associated with the relation value column, the attribute value acquired for each key value in the primary key column of the table having the attribute value column, and the statistical model of the type associated with the attribute value column.

2. The table operation system according to claim 1, wherein
the designation accepting unit:
displays a screen including:
a table name display field that displays a table name of each table;
a column name display field that displays a column name of each column included in a table indicated by a selected table name;
a selected column name display field that displays a column name of a selected relation value column or a column name of a selected attribute value column; and
a type selection field for selecting a type of a statistical model corresponding to a column name displayed in the selected column name display field;
accepts designation of at least two foreign key columns when column names of the at least two foreign key columns are selected from among column names displayed in the column name display field;
accepts designation of a relation value column and designation of a type of a statistical model associated with the relation value column when a column name of the relation value column is selected from among column names displayed in the column name display field and the type of the statistical model is selected in the type selection field; and
accepts designation of an attribute value column and designation of a type of a statistical model associated with the attribute value column when a column name of the attribute value column is selected from among column names displayed in the column name display field and the type of the statistical model is selected in the type selection field.

3. The table operation system according to claim 1, wherein
the grouping unit groups the key values such that one key value belongs to only one group.

4. The table operation system according to claim 1, wherein
the grouping unit groups the key values by permitting one key value to belong to a plurality of groups.

5. A table operation method configured to:
accept designation of at least two foreign key columns, designation of a relation value column, and designation of a type of a statistical model associated with the relation value column in a table having two or more foreign key columns and one or more relation value columns;
specify individual tables to serve as reference destinations of the designated respective foreign key columns and acquire a total value of relation values in the relation value column for each combination of key values in primary key columns of the specified individual tables;
group the respective key values in the primary key columns of the individual tables on the basis of the total value acquired for each combination of the key values in the primary key columns of the individual tables and the statistical model of the designated type; and
add, to each individual table, an attribute value column of which attribute value is identification information on a group to which each key value in each primary key column of each individual table belongs,
wherein, the table operation method configured to:
accept designation of an attribute value column included in a table to serve as a reference destination of one of the designated foreign key columns and designation of a type of a statistical model associated with the attribute value column,
acquire an attribute value in the designated attribute value column for each key value in a primary key column of the table having the attribute value column, and
group the respective key values in the primary key columns of the individual tables on the basis of a total value acquired for each combination of the key values in the primary key columns of the individual tables to serve as reference destinations of the designated respective foreign key columns, the statistical model of the type associated with the relation value column, the attribute value acquired for each key value in the primary key column of the table having the attribute value column, and the statistical model of the type associated with the attribute value column.

6. A non-transitory computer-readable recording medium in which a table operation program is recorded, the table operation program causing a computer to execute:
designation accepting processing of accepting designation of at least two foreign key columns, designation of a relation value column, and designation of a type of a statistical model associated with the relation value column in a table having two or more foreign key columns and one or more relation value columns;
data acquiring processing of specifying individual tables to serve as reference destinations of the designated respective foreign key columns and acquiring a total value of relation values in the relation value column for each combination of key values in primary key columns of the specified individual tables;
grouping processing of grouping the respective key values in the primary key columns of the individual tables on the basis of the total value acquired for each combination of the key values in the primary key columns of the individual tables and the statistical model of the designated type; and
attribute value column adding processing of adding, to each individual table, an attribute value column of which attribute value is identification information on a group to which each key value in each primary key column of each individual table belongs,
wherein,
the table operation program causes the computer to execute;
in the designation accepting processing, accepting designation of an attribute value column included in a table to serve as a reference destination of one of the designated foreign key columns and designation of a type of a statistical model associated with the attribute value column,
in the data acquiring processing, acquiring an attribute value in the designated attribute value column for each key value in a primary key column of the table having the attribute value column, and
in the grouping processing, grouping the respective key values in the primary key columns of the individual tables on the basis of a total value acquire for each combination of the key values in the primary key columns of the individual tables to serve as reference destinations of the designated respective foreign key columns, the statistical model of the type associated with the relation value column, the attribute value acquired for each key value in the primary key column of the table having the attribute value column, and the statistical model of the type associated with the attribute value column.

* * * * *

UNITED STATES PATENT AND TRADEMARK OFFICE
CERTIFICATE OF CORRECTION

PATENT NO. : 10,698,874 B2
APPLICATION NO. : 15/562542
DATED : June 30, 2020
INVENTOR(S) : Shinji Nakadai Page 1 of 1

It is certified that error appears in the above-identified patent and that said Letters Patent is hereby corrected as shown below:

In the Specification

Column 9, Description of Embodiments, Line 61; After "values", insert --$x_{c,i}$--

Column 10, Description of Embodiments, Line 23; After "values", insert --$x_{c,i}$--

Column 10, Description of Embodiments, Line 39; Delete "4" and insert --$z^C_c$-- therefor Column 10, Description of Embodiments, Line 52; After "value", insert --$x_{c,i}$--

Column 10, Description of Embodiments, Line 67; Before "appearing", insert --$x_{c,i}$--

Column 13, Description of Embodiments, Line 39; Delete ""$z^C_c$,"" and insert --"$z^C_c$"-- therefor Signed and Sealed this
Seventeenth Day of November, 2020

Andrei Iancu
*Director of the United States Patent and Trademark Office*